(12) United States Patent
Feist et al.

(10) Patent No.: US 9,045,830 B2
(45) Date of Patent: Jun. 2, 2015

(54) LUMINESCENT MATERIAL COMPOSITIONS AND STRUCTURES INCORPORATING THE SAME

(75) Inventors: Jörg Peter Feist, London (GB); John Rayment Nicholls, Great Horwood (GB); Michael James Fraser, Brussels (BE); Andrew Lawrence Heyes, London (GB); Stephen John Skinner, Basingstoke (GB)

(73) Assignee: New STS Limited, Surrey (GB)

( * ) Notice: Subject to any disclaimer, the term of this patent is extended or adjusted under 35 U.S.C. 154(b) by 1482 days.

(21) Appl. No.: 12/064,645

(22) PCT Filed: Aug. 24, 2006

(86) PCT No.: PCT/GB2006/003177
§ 371 (c)(1),
(2), (4) Date: Sep. 2, 2008

(87) PCT Pub. No.: WO2007/023293
PCT Pub. Date: Mar. 1, 2007

(65) Prior Publication Data
US 2009/0202864 A1     Aug. 13, 2009

(30) Foreign Application Priority Data

Aug. 24, 2005  (GB) .................................. 0517248.1
Aug. 24, 2005  (GB) .................................. 0517254.9
Aug. 24, 2005  (GB) .................................. 0517255.6
Aug. 24, 2005  (GB) .................................. 0517256.4

(51) Int. Cl.
| | |
|---|---|
| *B32B 9/00* | (2006.01) |
| *F01D 5/14* | (2006.01) |
| *C23C 28/00* | (2006.01) |
| *C23C 28/04* | (2006.01) |
| *F01D 5/28* | (2006.01) |
| *B32B 18/00* | (2006.01) |
| *C23C 4/04* | (2006.01) |
| *C23C 4/12* | (2006.01) |
| *C09K 11/77* | (2006.01) |
| *G01K 11/20* | (2006.01) |

(52) U.S. Cl.
CPC ........... *C23C 28/3455* (2013.01); *C23C 28/042* (2013.01); *F01D 5/288* (2013.01); *B32B 18/00* (2013.01); *C23C 4/127* (2013.01); *C23C 4/04* (2013.01); *C23C 28/325* (2013.01); *C09K 11/7706* (2013.01); *C09K 11/7728* (2013.01); *C09K 11/7764* (2013.01); *C09K 11/7769* (2013.01); *G01K 11/20* (2013.01); *G01K 2217/00* (2013.01)

(58) Field of Classification Search
CPC ...... B32B 18/00; B32B 9/04; B32B 2603/00; C23C 28/325; C23C 28/042; C23C 28/044; C23C 4/105; C23C 4/10; C23C 4/127; C23C 4/04; C23C 28/3455; F01D 5/288; F01D 5/284; F01D 25/145; C04B 30/00
USPC ........ 252/301.4 R, 301.4 F, 30.14 R, 62, 582; 257/E33.061; 428/690, 469, 472, 633, 428/701, 702, 703; 313/467, 468; 461/241 R; 29/889.72
See application file for complete search history.

(56) References Cited

U.S. PATENT DOCUMENTS

| | | | | |
|---|---|---|---|---|
| 6,197,218 | B1 * | 3/2001 | Hampden-Smith et al. | ...................... 252/301.4 R |
| 6,730,918 | B2 * | 5/2004 | Srivastava et al. | ......... 250/458.1 |
| 6,974,641 | B1 * | 12/2005 | Choy et al. | .................... 428/704 |
| 7,258,816 | B2 * | 8/2007 | Tamaki et al. | .......... 252/301.4 F |
| 7,510,776 | B2 * | 3/2009 | Choy et al. | .................... 428/469 |
| 8,057,924 | B2 * | 11/2011 | Kaiser et al. | .................. 428/701 |
| 2005/0094533 | A1 * | 5/2005 | Gibson | ........................ 369/100 |
| 2006/0035079 | A1 * | 2/2006 | Xu et al. | ........................ 428/402 |
| 2006/0124951 | A1 * | 6/2006 | Sakata et al. | .................... 257/99 |
| 2006/0159939 | A1 * | 7/2006 | Lampenscherf | .............. 428/469 |
| 2006/0177665 | A1 * | 8/2006 | Bast et al. | .................. 428/411.1 |
| 2006/0177676 | A1 | 8/2006 | Bast et al. | |
| 2008/0136324 | A1 | 6/2008 | Bast et al. | |

FOREIGN PATENT DOCUMENTS

| | | |
|---|---|---|
| DE | 10200803 A | 1/2002 |
| EP | 1657536 A | 11/2004 |
| WO | 00/06796 | 2/2000 |
| WO | 03/057941 | 7/2003 |
| WO | 2005/019370 | 3/2005 |
| WO | 2005/019601 | 3/2005 |
| WO | 2005/019784 | 3/2005 |
| WO | WO 2005019601 A1 * | 3/2005 |
| WO | 2006/099901 | 9/2006 |

OTHER PUBLICATIONS

Zhu et al., 'Advanced Oxide Material Systems for 1650 C Thermal/Environmental Barrier Coating Applications', Dec. 2004, NASA/TM-2004-213219, pp. 1-8.*
EIC STIC search report.*
Moskal et al. "Microstructure and thermal diffusivity of Gd2Zr2O7 powders", 2010, Advanced Materials Research, vols. 89-91, pp. 739-744.*
Kvapil, J. et al.; "Luminescence sensitization in Nd—Cr—Ce doped yttrium aluminates", INSPEC abstract, XP-002419865, 1988.
Mares, J. et al.; "Survey of the properties of YAG:Nd and YAP:Nd laser crystals", INSPEC Abstract, XP-002419866, 1989.
Lin, Y.S. et al.; "Investigation of the Luminescent Properties of TB3+—Substituted YAG:Ce, Gd Phosphors", Journal of the Electrochemical Society, vol. 152, No. 6, pp. J41-J45, 2005.
Pan, Y. et al.; "Comparative investigation on synthesis and photoluminescence of YAG:Ce phosphor", Materials Science and Engineering B, vol. 106, Issue 3, pp. 251-256, 2004.

* cited by examiner

*Primary Examiner* — C. Melissa Koslow
*Assistant Examiner* — Lynne Edmondson
(74) *Attorney, Agent, or Firm* — Renner, Otto, Boisselle & Sklar, LLP

(57) ABSTRACT

Luminescent material compositions, in particular for use in high-temperature environments, and structures, such as thermal barrier coatings (TBCs), which incorporate the same.

36 Claims, 21 Drawing Sheets

LUMINESCENT MATERIAL COMPOSITIONS AND STRUCTURES INCORPORATING THE SAME

This application is a national phase of International Application No. PCT/GB2006/003177 filed Aug. 24, 2006 and published in the English language.

The present invention relates to luminescent material compositions, in particular for use in high-temperature environments, and structures, such as thermal barrier coatings (TBCs), which incorporate the same.

TBCs are structural coatings which are applied to components which are subjected to high temperatures, often greater than 1000 C, and thus would be prone inter alia to oxidation and corrosion processes. Typical applications are in the aviation and power generation industries, particularly in the coating of turbine components, such as vanes and blades.

Gas turbines have been used to power aircraft and in the production of electricity since their invention in 1939 There has been a continuous drive to increase fuel efficiency, with fuel consumption having more than halved over the last three or four decades. This has been achieved principally by increasing firing temperatures. Apart from new alloys and cooling methods, TBCs have played a major role in this development. These coatings were first used on jet engines in the 1970's and are now a common feature on power generation turbines. The use of TBCs allows turbines to be operated at temperatures above the melting point of the metal components in the hot section, such as vanes and blades, thereby increasing efficiency and reducing $CO_2$ emissions.

Existing TBCs are predominantly formed from yttria-stabilized zirconia (YSZ), though other ceramic materials, such as pyrochlores, are now being considered, and provide thermal insulation and oxidation protection on turbine blades, vanes and combustion chamber liners in gas turbines used in power generation and aviation.

As disclosed in the applicant's earlier WO-A-00/06796, the provision of luminescent materials in TBCs enables the in situ optical measurement of characteristics of the TBCs, in particular the temperature of the TBCs.

Such measurement of characteristics of TBCs is of great advantage, but there is a limit to the operating temperature of existing luminescence systems.

It is an aim of the present invention to provide luminescent material compositions which are operative in higher-temperature environments, typically those in excess of 1000 C, and ideally in the range of from 1000 to 1600 C, and structures which incorporate the same. It is also desirable that the luminescent material compositions provide for a repeatable measurement with a high degree of accuracy.

In one aspect the present invention provides a luminescent material composition comprising a first, structural or matrix phase, a second phase within the matrix phase, and at least one luminescent dopant.

In another aspect the present invention provides a structure comprising a main, structural or matrix phase, and a plurality of discrete, luminescent atomic clusters or particles which are distributed within the structural phase and act, when excited by an excitation signal, to emit a luminescence signal which is representative of one or more characteristics of the structure.

In a further aspect the present invention provides a luminescent material composition comprising a YAG-based host phase and at least one luminescent dopant.

In a still further aspect the present invention provides a luminescent material composition comprising a YAP-based host phase and at least one luminescent dopant.

In a yet further aspect the present invention provides a luminescent material composition comprising a $GdAlO_3$-based host phase and at least one luminescent dopant.

In a still yet further aspect the present invention provides a luminescent material composition which comprises an $A_2B_2O_7$ (pyrochlore) host phase which is doped with at least one luminescent dopant, where A comprises one or more elements selected from the lanthanide series or the actinide series and B comprises one or more elements selected from the group of transition metals.

Preferred embodiments of the present invention will now be described hereinbelow by way of example only with reference to the accompanying drawings, in which.

Figure 20:
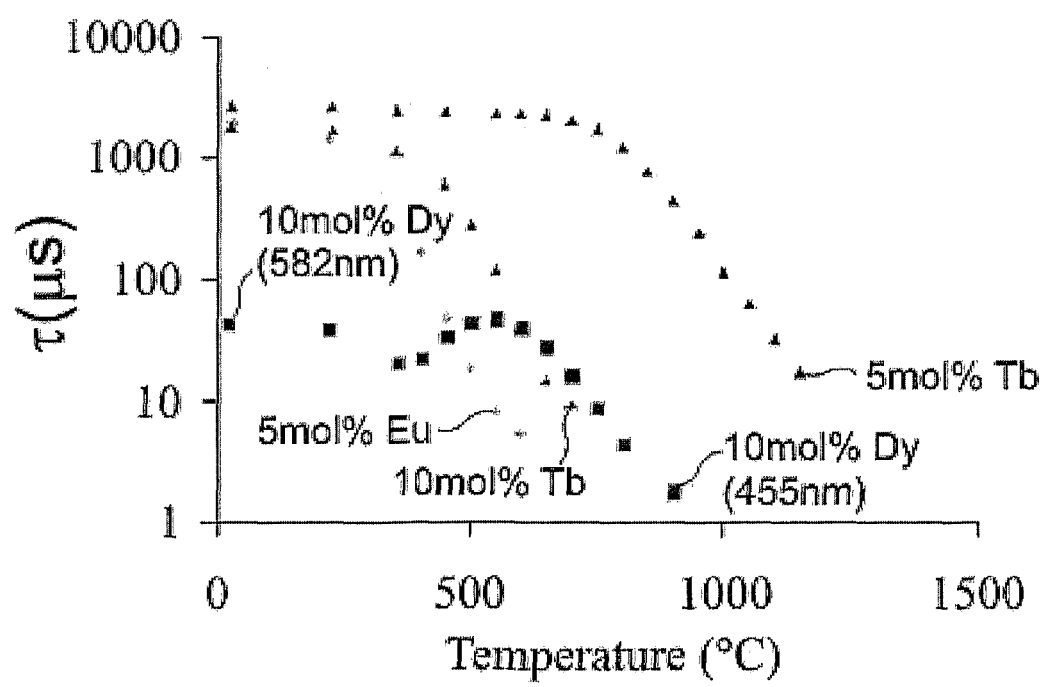
Figure 21:
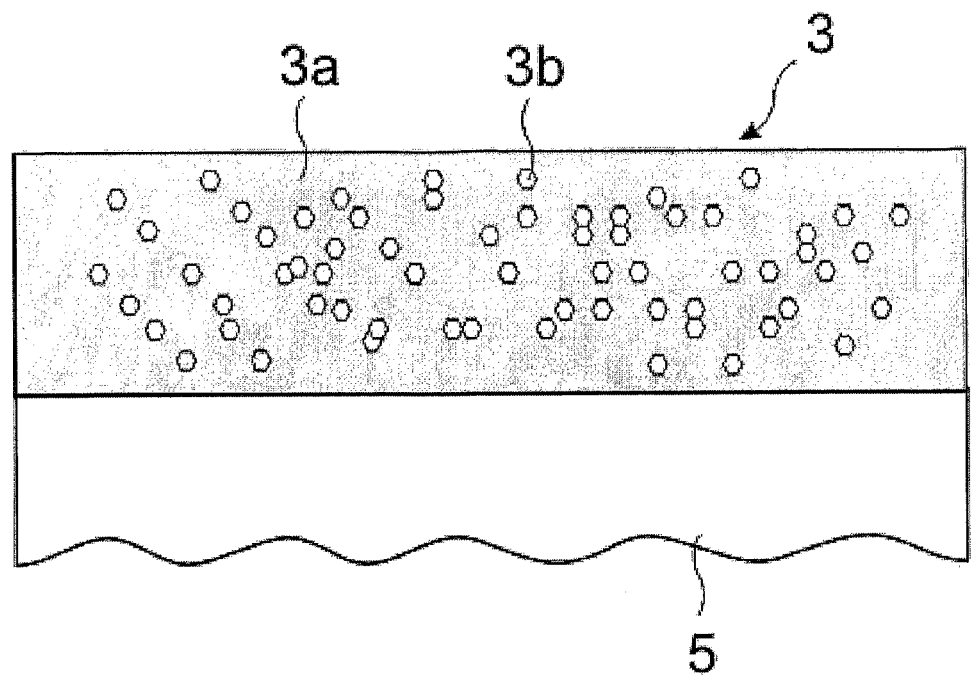
Figure 22:
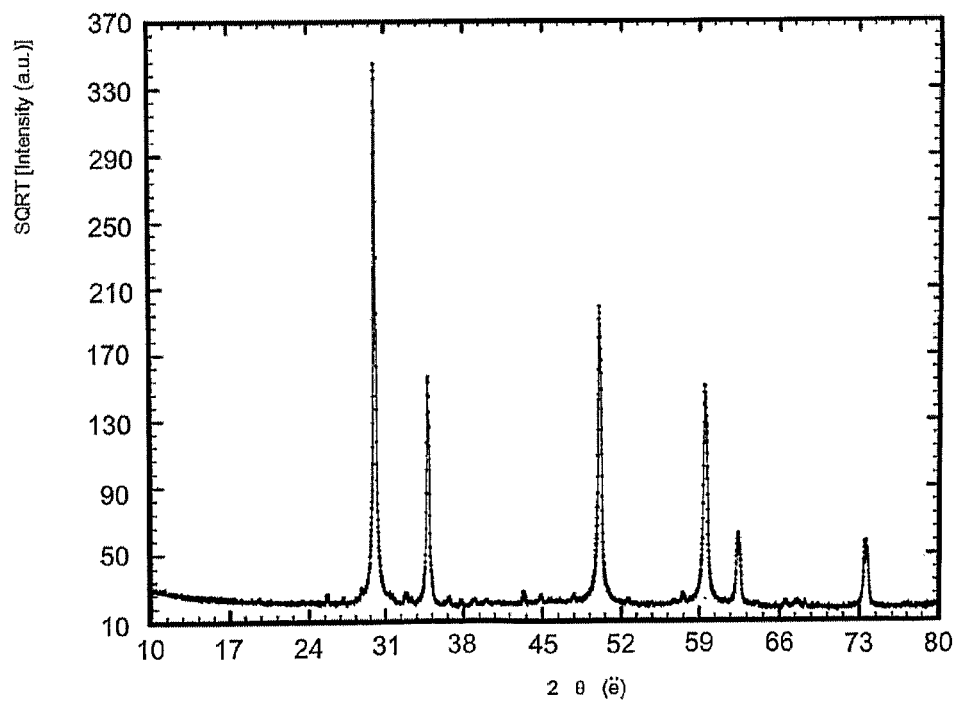
Figure 23:
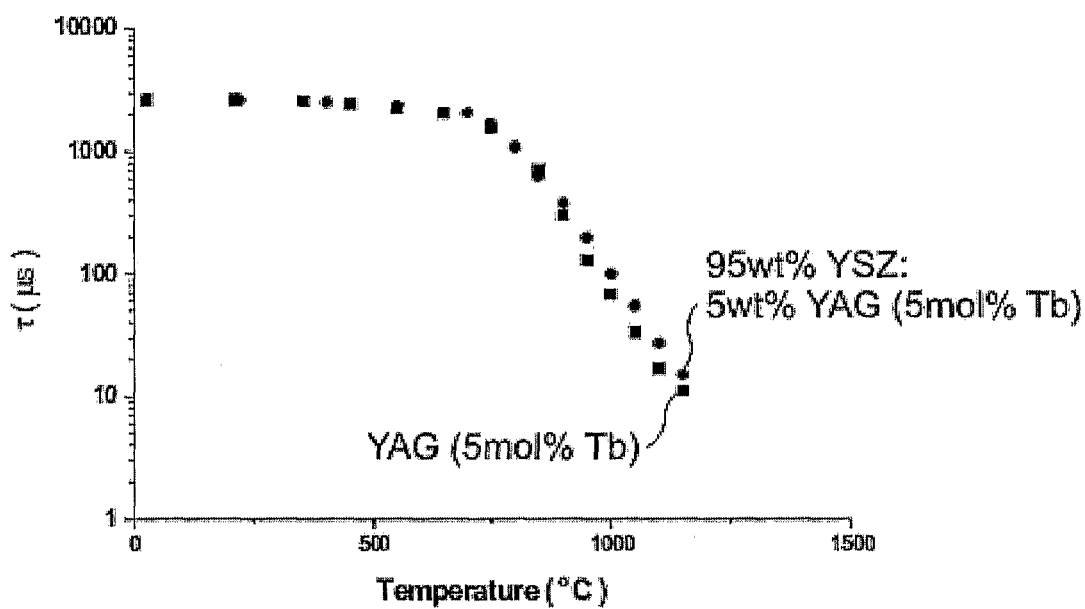
Figure 24:
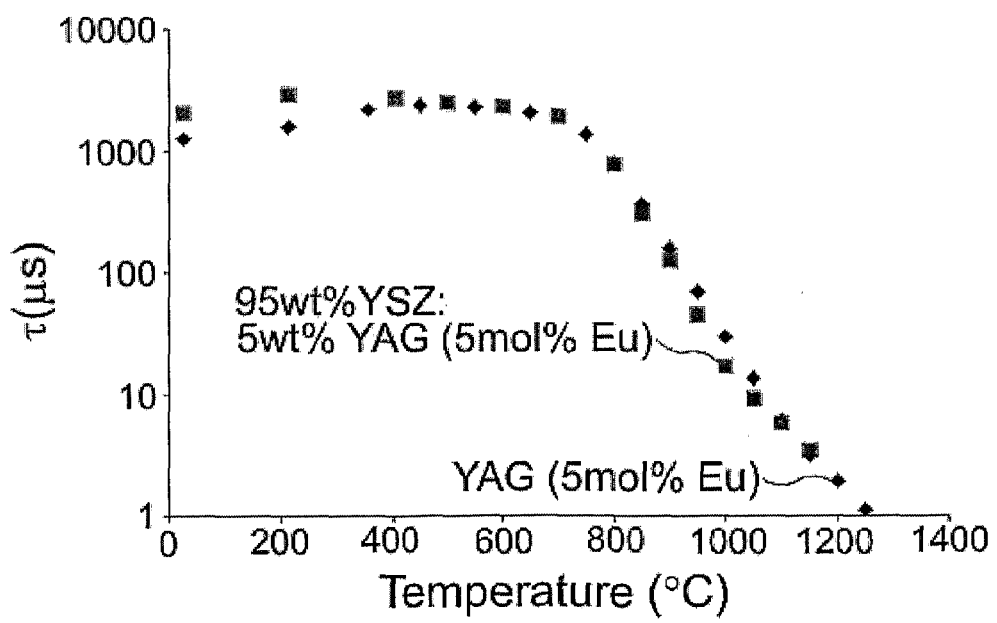
Figure 25:
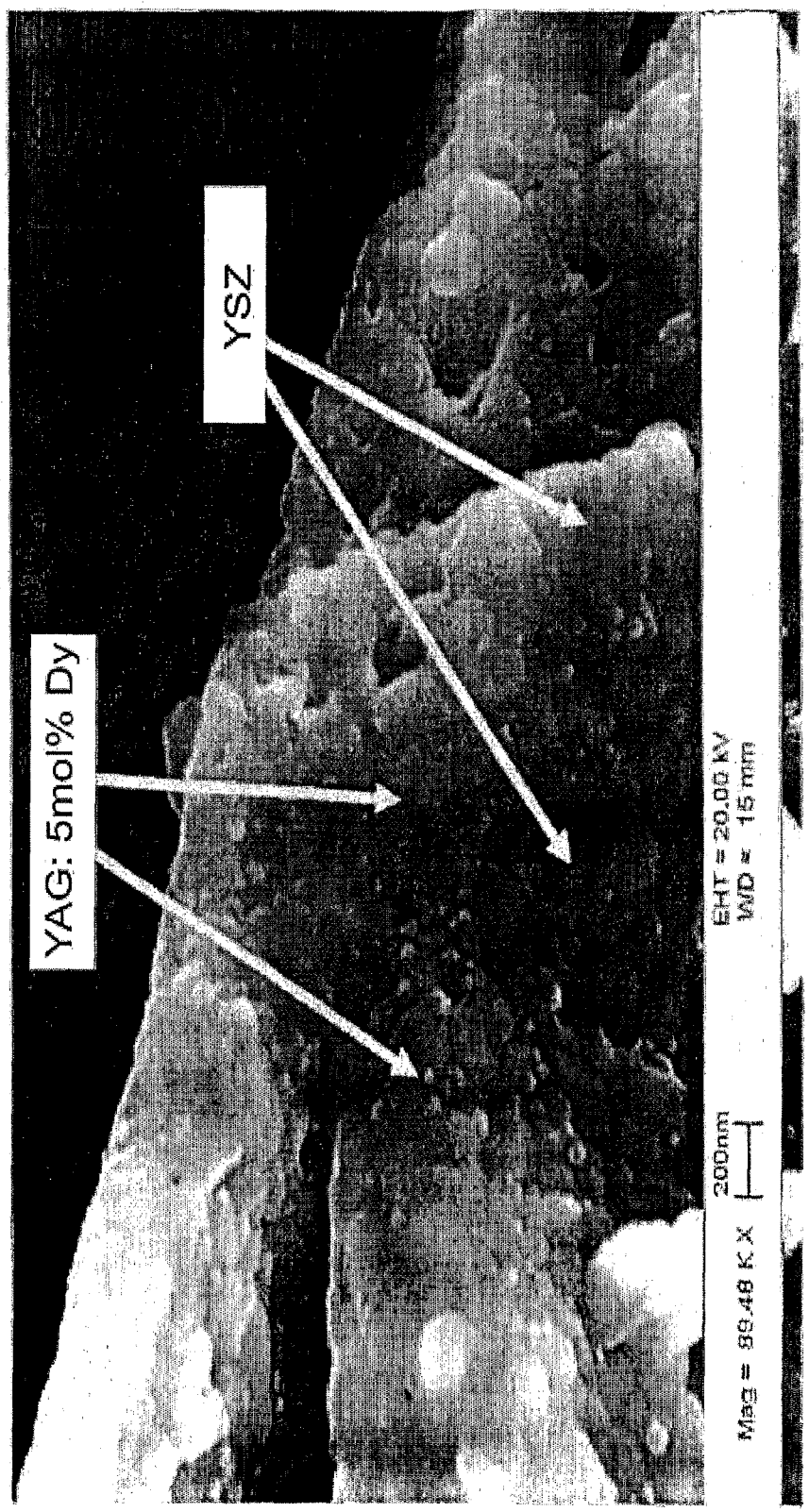
Figure 26:
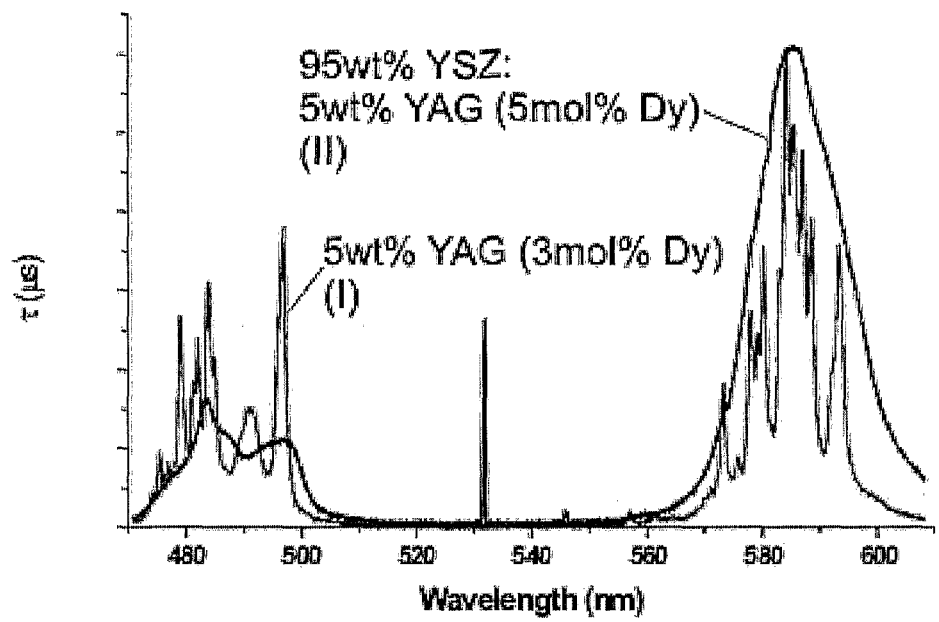
Figure 29:
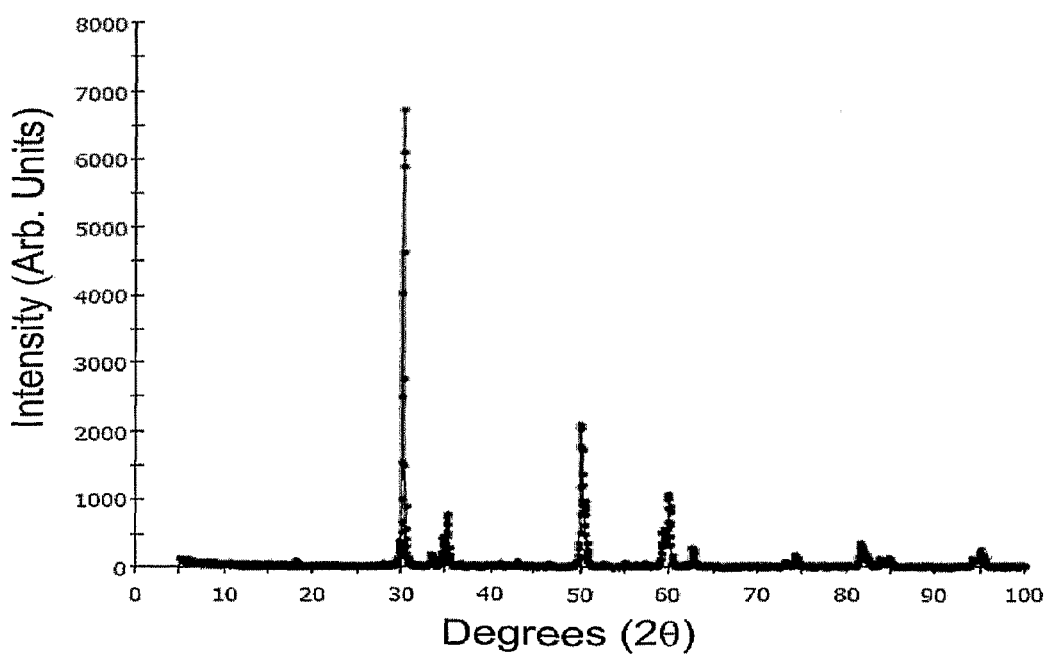
Figure 30:
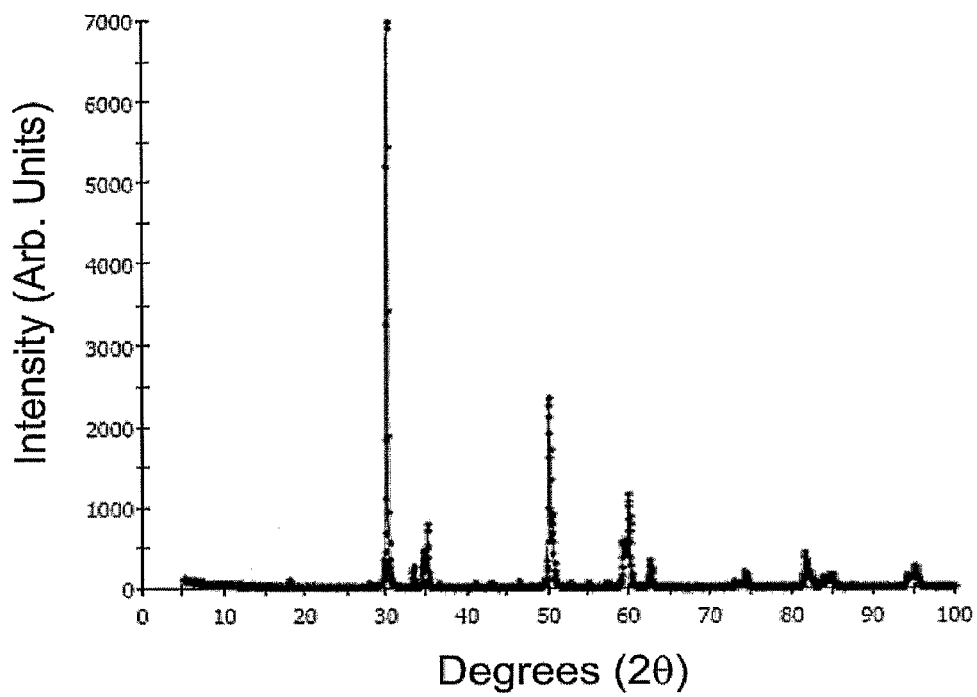
Figure 31:
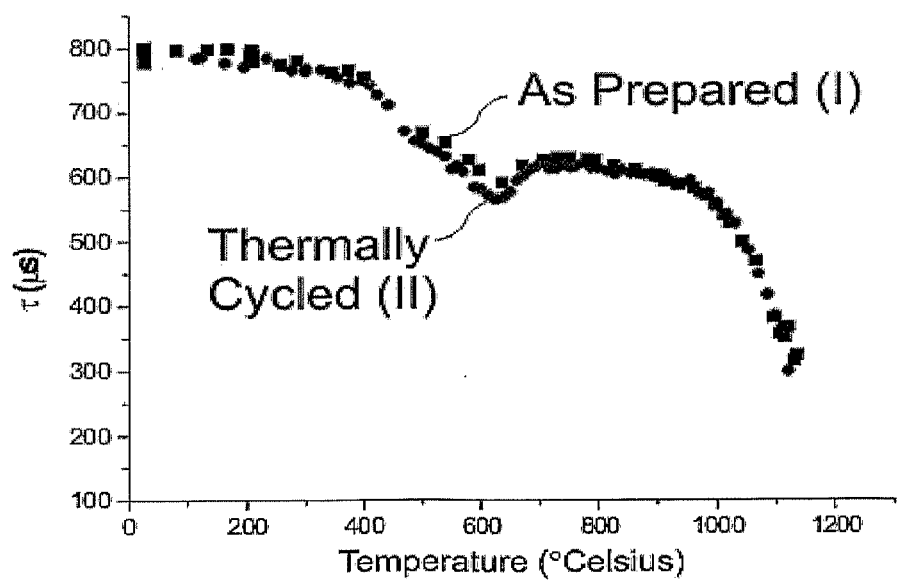
Figure 32:
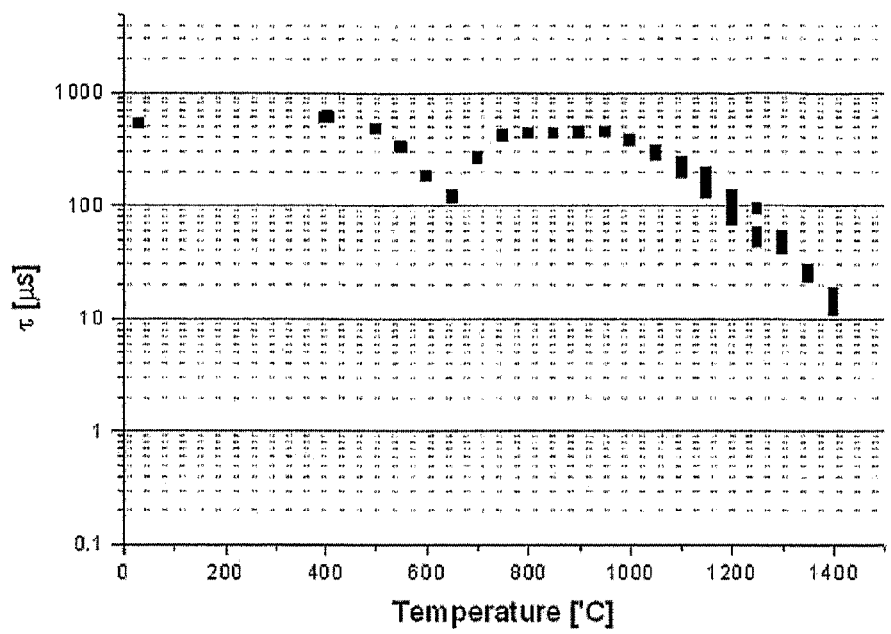
Figure 33:
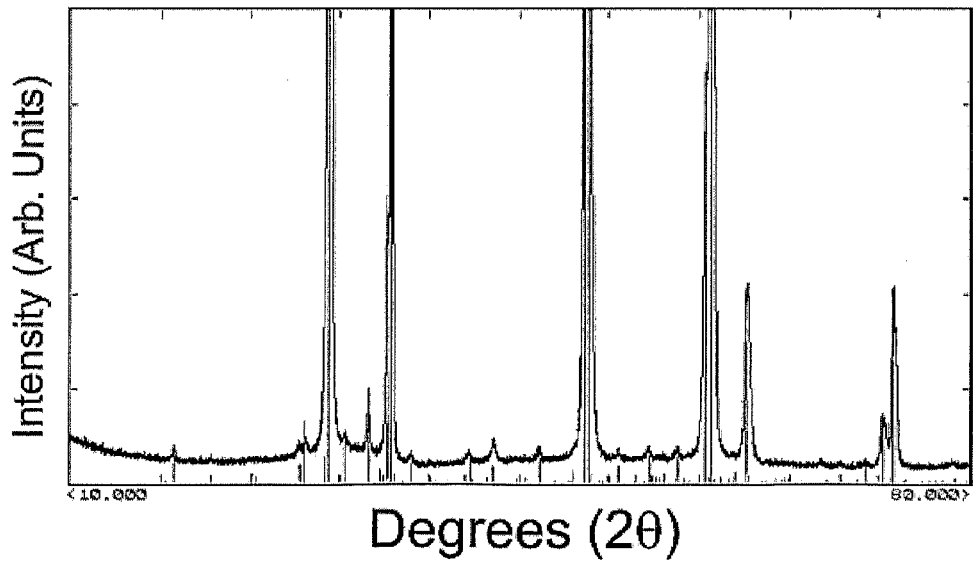
Figure 34:
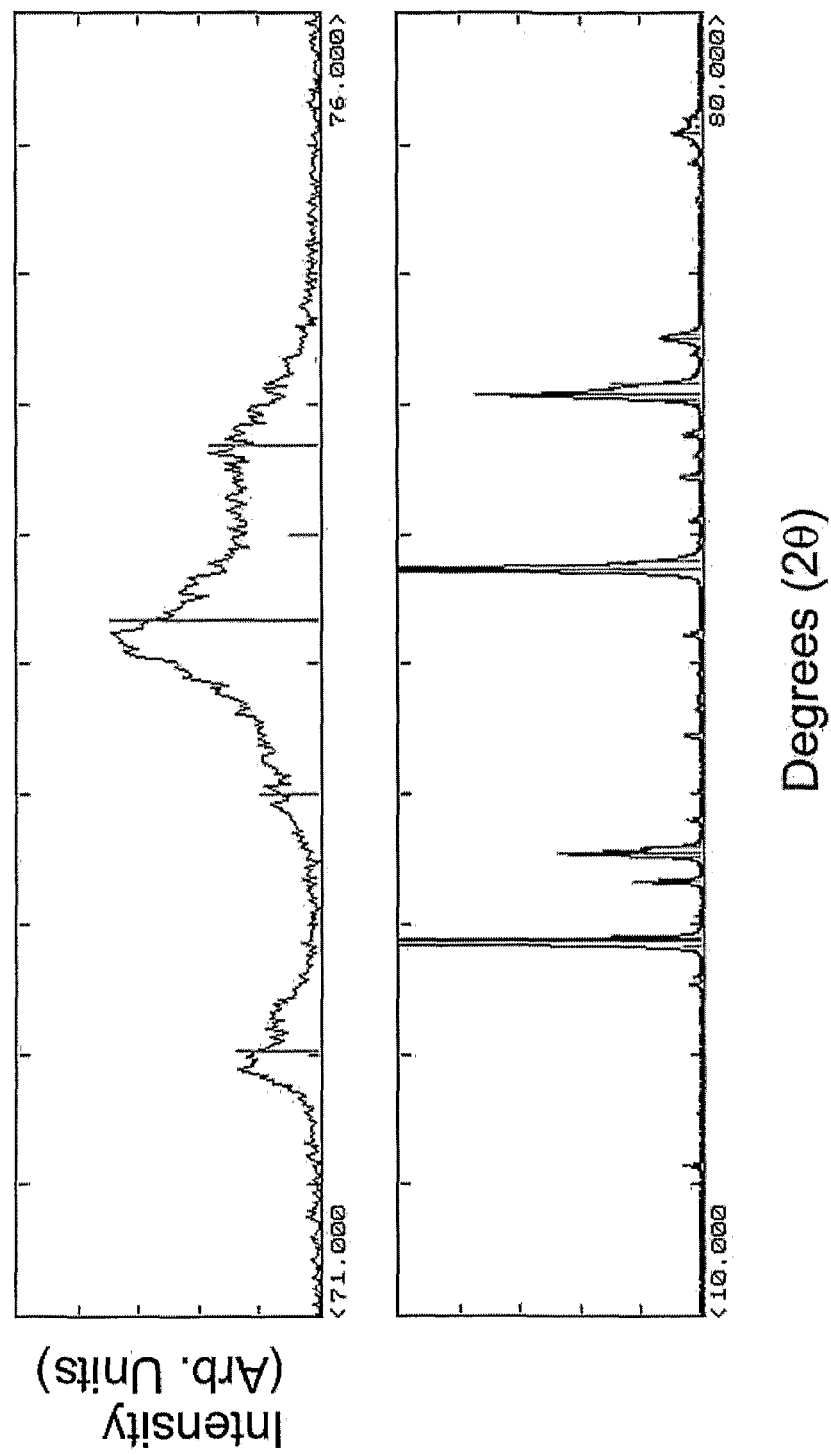
Figure 35:
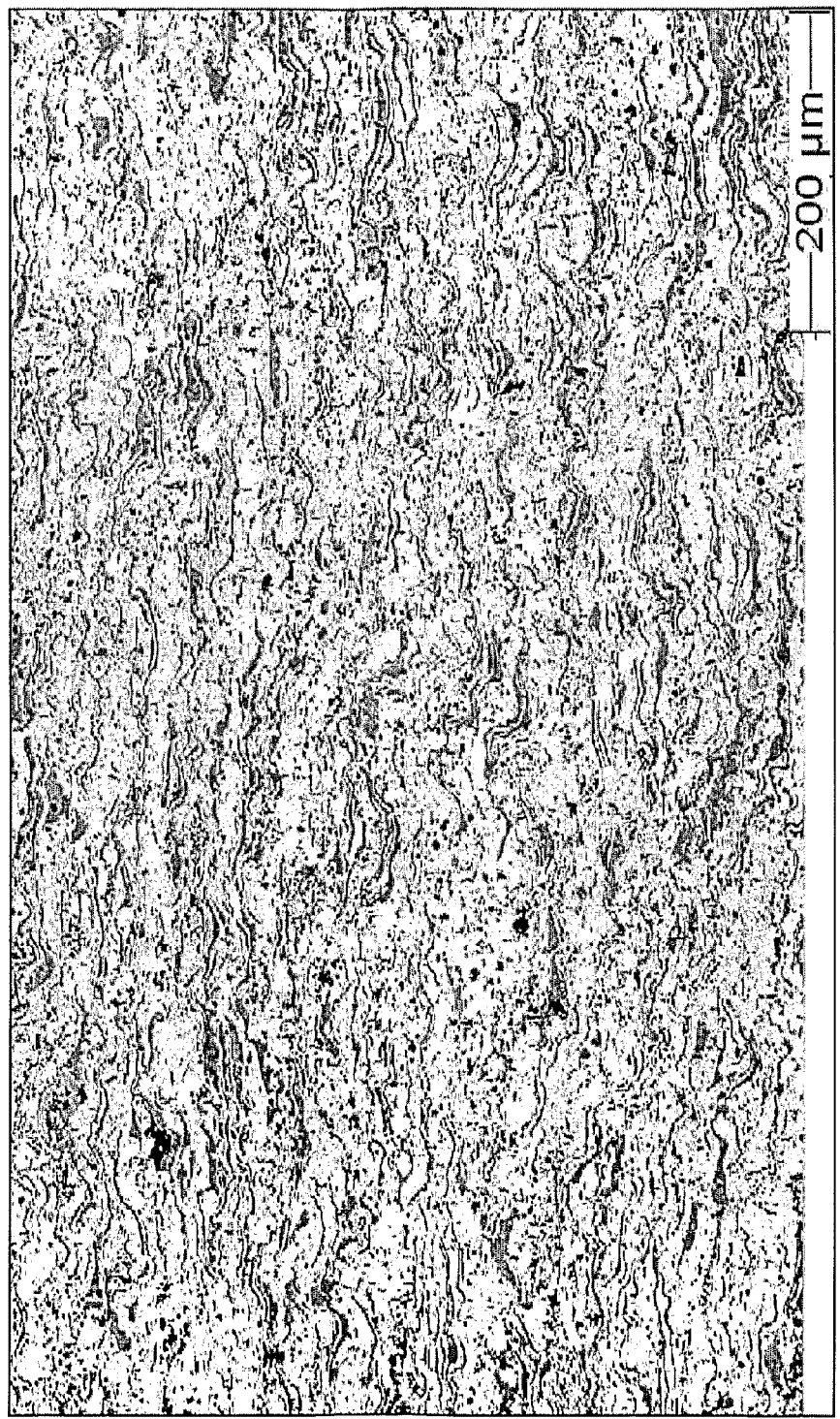
Figure 36:
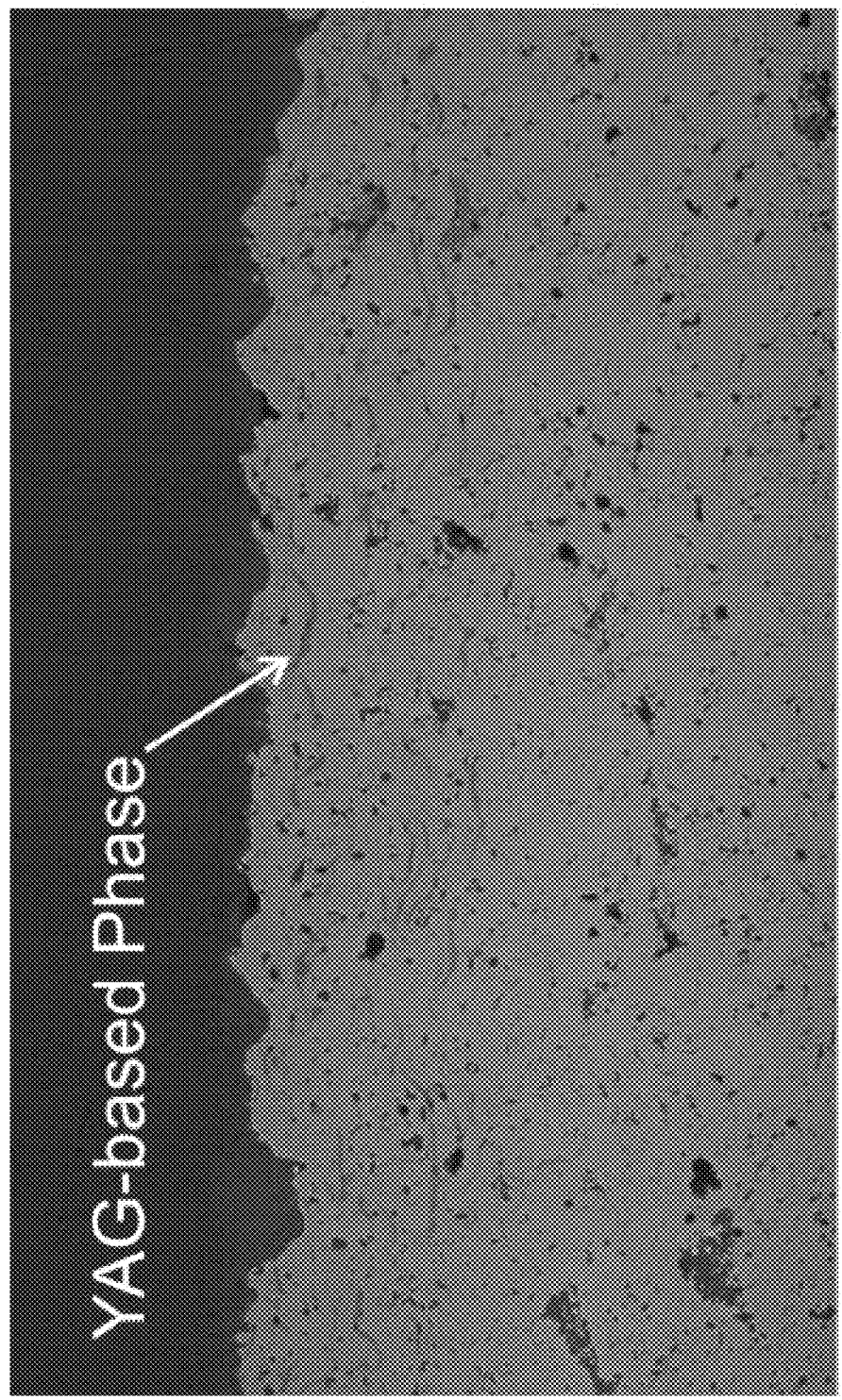
Figure 37:
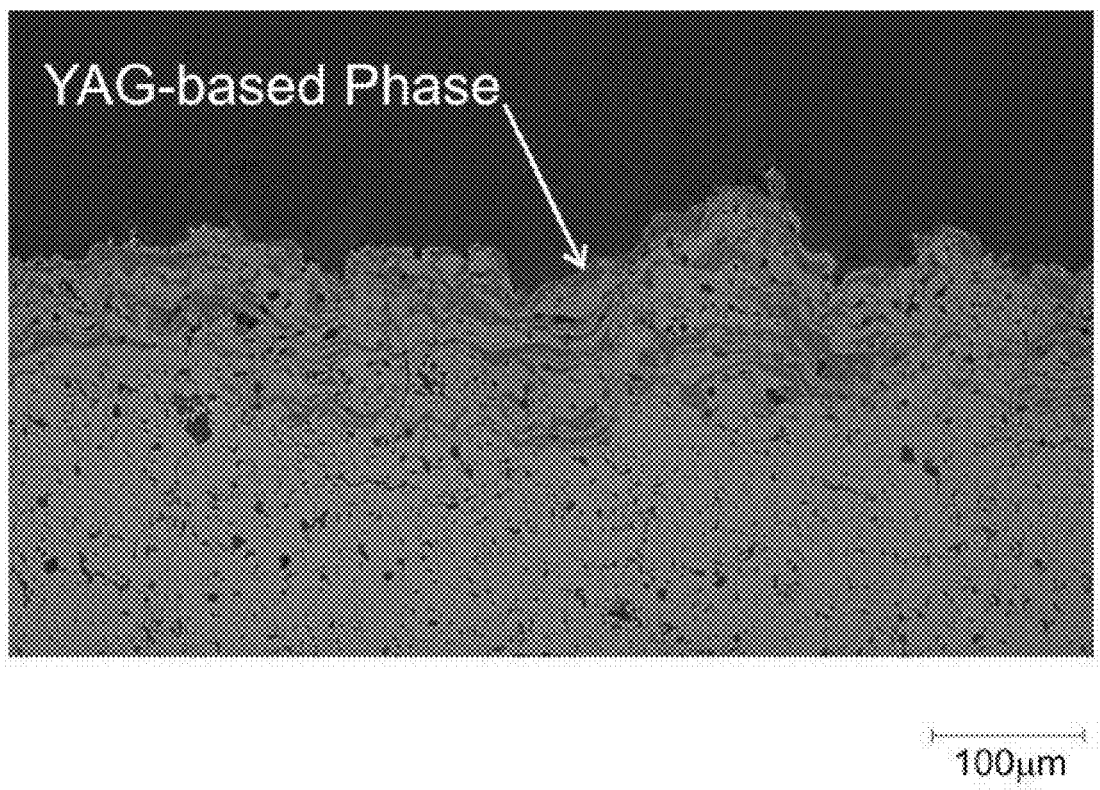

FIG. 20 illustrates a plot of the life-time decay as a function of temperature for material compositions comprising an La$_2$Zr$_2$O$_7$ (pyrochlore) host phase which is doped with Tb in amounts of 5 mol % and 10 mol %, a material composition comprising an La$_2$Zr$_2$O$_7$ (pyrochlore) host phase which is doped with Eu in an amount of 5 mol %, and a material composition comprising an La$_2$Zr$_2$O$_7$ (pyrochlore) host phase which is doped with Dy in an amount of 10 mol %;

FIG. 21 schematically represents a structure in accordance with a preferred embodiment of the present invention;

FIG. 22 illustrates an XRD pattern for a material composition comprising 95 wt % of a YSZ matrix phase and 5 wt % of a YAG-based luminescent phase which is doped with Tb in an amount of 5 mol %;

FIG. 23 illustrates a plot of the life-time decay as a function of temperature for the material composition of FIG. 22, and a material composition comprising a YAG host phase which is doped with Tb in an amount of 5 mol %;

FIG. 24 illustrates a plot of the life-time decay as a function of temperature for a material composition comprising 95 wt % of a YSZ matrix phase and 5 wt % of a YAG-based second phase which is doped with Eu in an amount of 5 mol %, and a material composition comprising a YAG host phase which is doped with Eu in an amount of 5 mol %;

FIG. 25 illustrates a scanning electron micrograph (SEM) of a material composition comprising 95 wt % of a YSZ matrix phase and 5 wt % of a YAG-based second, luminescent phase which is doped with Dy in an amount of 5 mol %;

FIG. 26 illustrates the optical spectra for the YAG-based luminescent phase of the material composition of FIG. 25 (I) and a single-phase YAG-based luminescent material composition doped with Dy in an amount of 3 mol % (II);

FIGS. 27 to 30 illustrate XRD patterns for a material composition comprising 95 wt % of a YSZ matrix phase and 5 wt % of a YAG-based luminescent phase which is doped with Dy in an amount of 3 mol %;

FIG. 31 illustrates a plot of the life-time decay as a function of temperature for the material composition of FIGS. 27 to 30 as prepared by the precipitation route (I) and subsequent to being subjected to thermal cycling (II);

FIG. 32 illustrates a plot of the life-time decay as a function of temperature for a material composition comprising 95 wt % of a YSZ matrix phase and 5 wt % of a YAG-based luminescent phase which is doped with Dy in an amount of 3 mol % as prepared by the precipitation route and subsequent to being subjected to thermal cycling;

FIGS. 33 and 34 illustrate XRD patterns for a material composition comprising 90 wt % of a YSZ matrix phase and 10 wt % of a YAG-based luminescent phase which is doped with Dy in an amount of 5 mol % as sprayed and following annealing, respectively;

FIG. 35 illustrates a sectional scanning electron micrograph (SEM) of the material composition of FIGS. 33 and 34;

FIG. 36 illustrates a sectional scanning electron micrograph (SEM) of a material composition comprising 95 wt % of a YSZ matrix phase and 5 wt % of a YAG-based luminescent phase which is doped with Eu in an amount of 5 mol %; and FIG. 37 illustrates a sectional scanning electron micrograph (SEM) of a material composition comprising 80 wt % of a YSZ matrix phase and 20 wt % of a YAG-based luminescent phase which is doped with Tm in an amount of 5 mol %.

(I) SINGLE-PHASE MATERIALS

In this aspect the present invention relates to a plurality of single-phase luminescent materials, which provide for luminescence to elevated temperatures, in particular 1000 C, as compared to the state of the art.

(a) YAG Material Compositions

In this aspect the present invention relates to a luminescent material composition comprising a YAG-based host phase and at least one luminescent dopant.

In one embodiment the YAG-based host phase comprises Y$_3$Al$_5$O$_{12}$.

In another embodiment the YAG-based host phase comprises Y$_3$Al$_x$Fe$_{5-x}$O$_{12}$, where X>0.

In one embodiment the at least one luminescent dopant comprises one or more elements selected from the lanthanide series (rare earth metals).

Preferably, the at least one luminescent dopant comprises one or more elements selected from Ce, Dy, Er, Eu, Gd, Ho, Nd, Pr, Sm, Tb, Tm and Yb.

In one embodiment the at least one luminescent dopant is doped in an amount of between 0.1 mol % and 6 mol %.

In another embodiment the at least one luminescent dopant is doped in an amount of between 0.5 mol % and 6 mol %.

In a further embodiment the at least one luminescent dopant is doped in an amount of between 3 mol % and 6 mol %.

In a still further embodiment the at least one luminescent dopant is doped in an amount of between 4.5 mol % and 5.5 mol %.

In a yet further embodiment the at least one luminescent dopant is doped in an amount of about 3 mol %.

In a still yet further embodiment the at least one luminescent dopant is doped in an amount of about 5 mol %.

In one embodiment the luminescent material composition is incorporated in a structure, in a preferred embodiment as a coating, and more particularly as a thermal barrier coating.

In one embodiment the coating is a multi-layer coating, of which one layer comprises the luminescent material composition.

This embodiment of the present invention will now be described with reference to the following non-limiting Examples.

Example 1A

In this Example, a material composition is presented which comprises a YAG phase which is doped with Tb in an amount of 5 mol %.

In one embodiment the doped YAG phase can be produced by plasma spraying, typically air plasma spraying, precursor powders In this embodiment the material as plasma sprayed is not fully crystalline, and an annealing step is subsequently performed at a temperature above the crystallisation temperature, in this embodiment at 915 C, to cause crystallization.

In another embodiment the doped YAG phase can be produced by solution chemistry, such as by the Pechini process or by urea precipitation.

In a further embodiment the doped YAG phase can be produced by a solid state reaction, in which a mixture of oxides or carbonates are heated to a high temperature.

Figure 1:
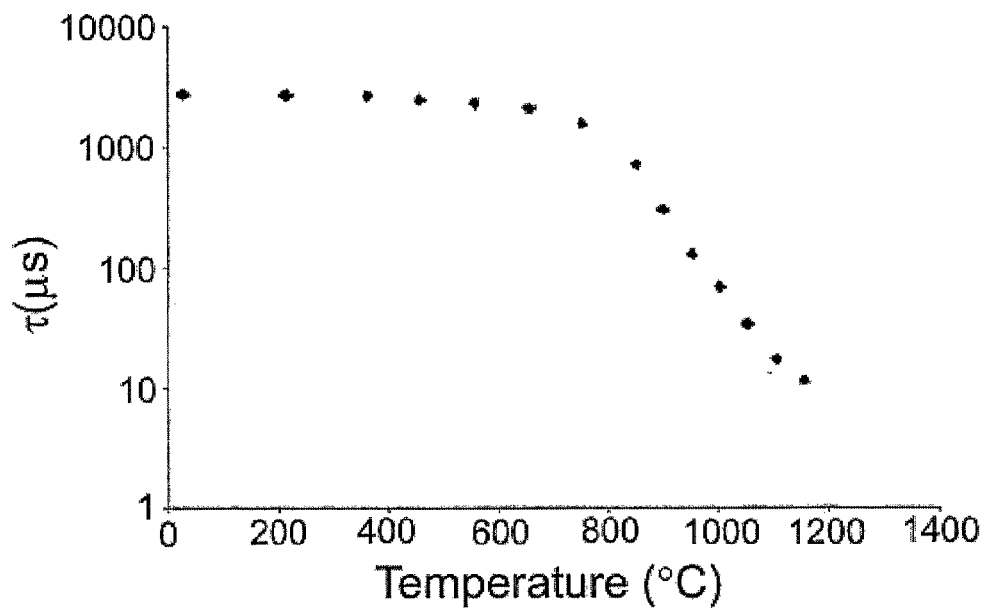
FIG. 1 illustrates a plot of the life-time decay as a function of temperature for a material composition comprising a YAG host phase which is doped with Tb in an amount of 5 mol %.

FIG. 1 illustrates a plot of the life-time decay as a function of temperature for this material composition, where utilizing an excitation wavelength of 266 nm and observed at a wavelength of 543 nm. As is clearly illustrated, the exemplified material composition operates at markedly-increased temperatures of up to at least 1200 C as compared to existing luminescence systems.

Example 1B

In this Example, a material composition is presented which comprises a YAG phase which is doped with Eu in an amount of 5 mol %.

In one embodiment, as in this embodiment, the doped YAG phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAG phase can be produced by solution chemistry, such as by the Pechini process or by urea precipitation.

In a further embodiment the doped YAG phase can be produced by a solid state reaction, in which a mixture of oxides or carbonates are heated to a high temperature.

Figure 2:
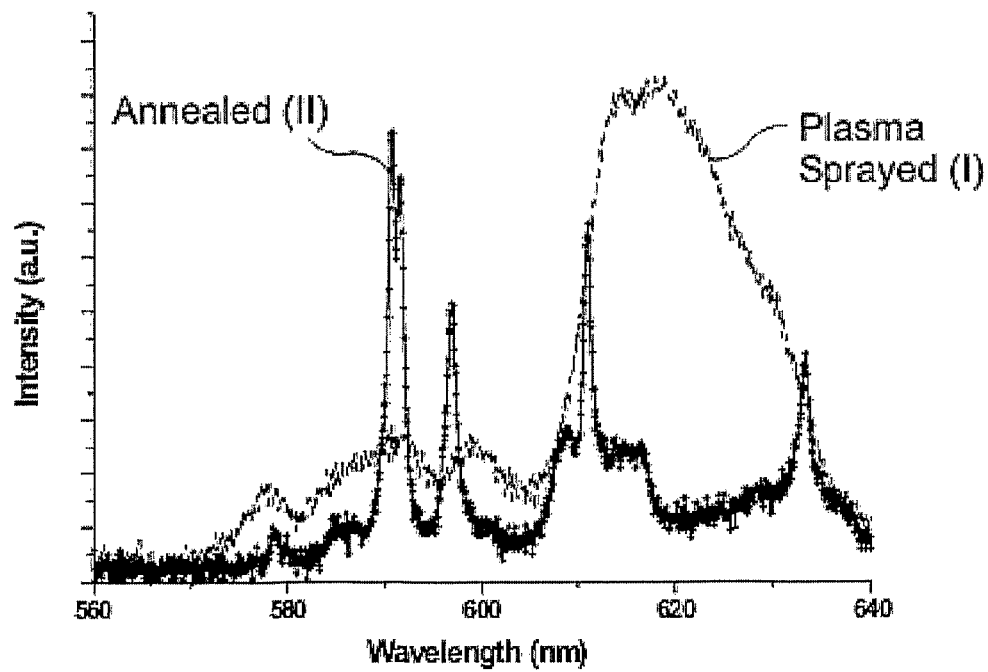
FIG. 2 illustrates the optical spectra for a material composition comprising a YAG host phase which is doped with Eu in an amount of 5 mol % as plasma sprayed (I) and following annealing (II)

FIG. 2 illustrates the optical spectra for this material composition as plasma sprayed (I) and subsequently annealed (II), where utilizing an excitation wavelength of 266 nm. As can be clearly observed, the material as plasma sprayed has an amorphous state, and, following annealing, the material has a crystalline state.

Figure 3:
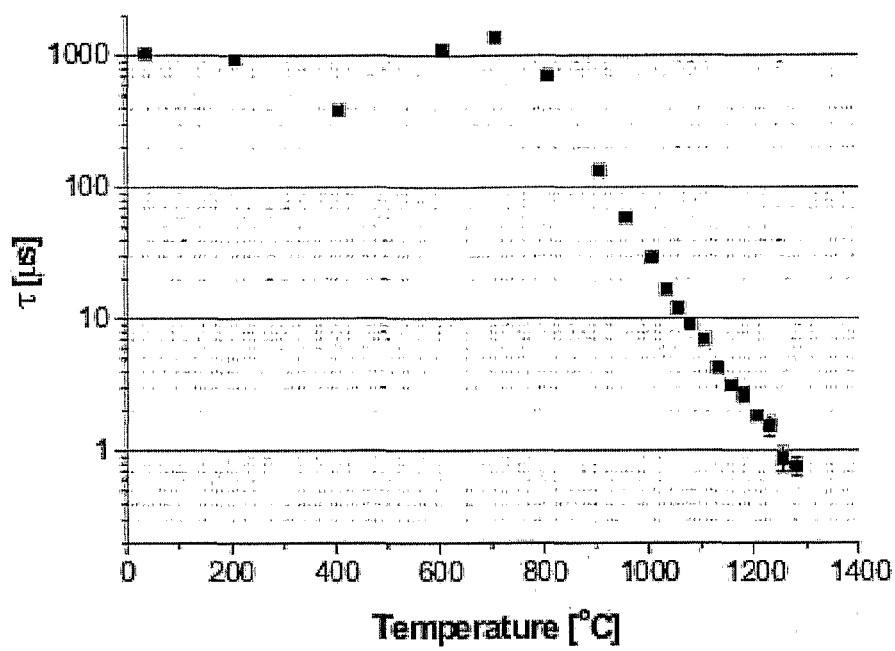
FIG. 3 illustrates a plot of the life-time decay as a function of temperature for the material composition of FIG. 2 as plasma sprayed and prior to annealing.

FIG. 3 illustrates a plot of the life-time decay as a function of temperature for this material composition as plasma sprayed and prior to annealing, where utilizing an excitation wavelength of 266 nm and observed at a wavelength of 617 nm. As will be observed, the life-time decay shows an intermediate dip, here at a temperature of about 400 C, which is indicative of the material not being fully crystalline.

Figure 4:
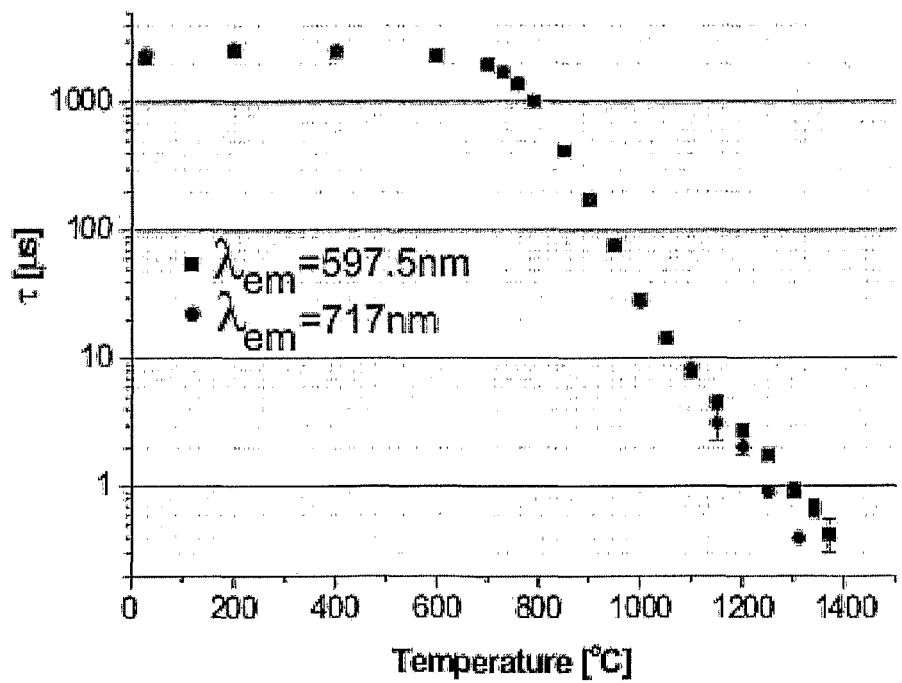
FIG. 4 illustrates a plot of the life-time decay as a function of temperature for the material composition of FIG. 2 following annealing.

FIG. 4 illustrates a plot of the life-time decay as a function of temperature for this material composition following annealing, where utilizing an excitation wavelength of 266 nm and observed at wavelengths of 597.5 nm and 717 nm. As is clearly illustrated, the exemplified material composition operates at markedly-increased temperatures of at least 1300 C as compared to existing luminescent systems.

Example 1C

In this Example, a material composition is presented which comprises a YAG phase which is doped with Tm in an amount of 5 mol %.

In one embodiment, as in this embodiment, the doped YAG phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAG phase can be produced by solution chemistry, such as by the Pechini process or by urea precipitation.

In a further embodiment the doped YAG phase can be produced by a solid state reaction, in which a mixture of oxides or carbonates are heated to a high temperature.

Figure 5:
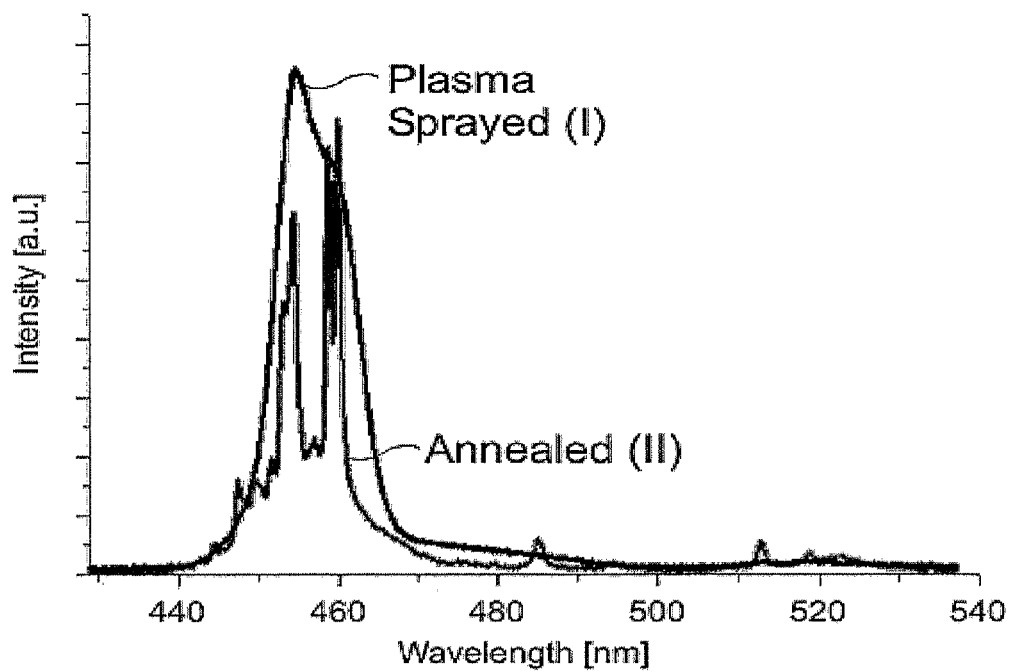
FIG. 5 illustrates the optical spectra for a material composition comprising a YAG host phase which is doped with Tm in an amount of 5 mol % as plasma sprayed (I) and following annealing (II)

FIG. 5 illustrates the optical spectra for this material composition as plasma sprayed (I) and subsequently annealed (II), where utilizing an excitation wavelength of 355 nm. As can be clearly observed, the material as plasma sprayed has an amorphous state, and, following annealing, the material has a crystalline state.

Figure 6:
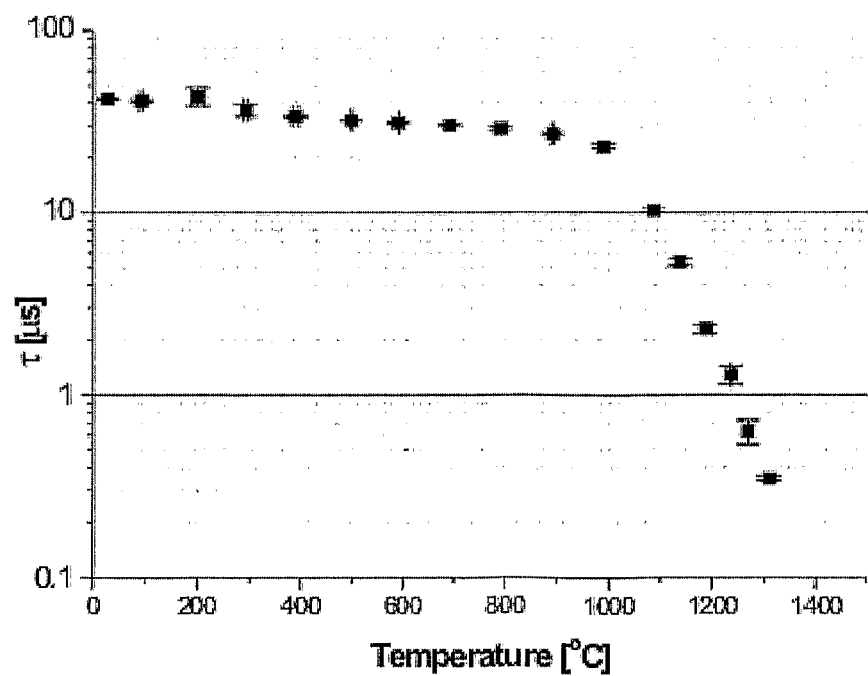
FIG. 6 illustrates a plot of the life-time decay as a function of temperature for the material composition of FIG. 5 as a plasma-sprayed powder and following annealing.
Figure 7:
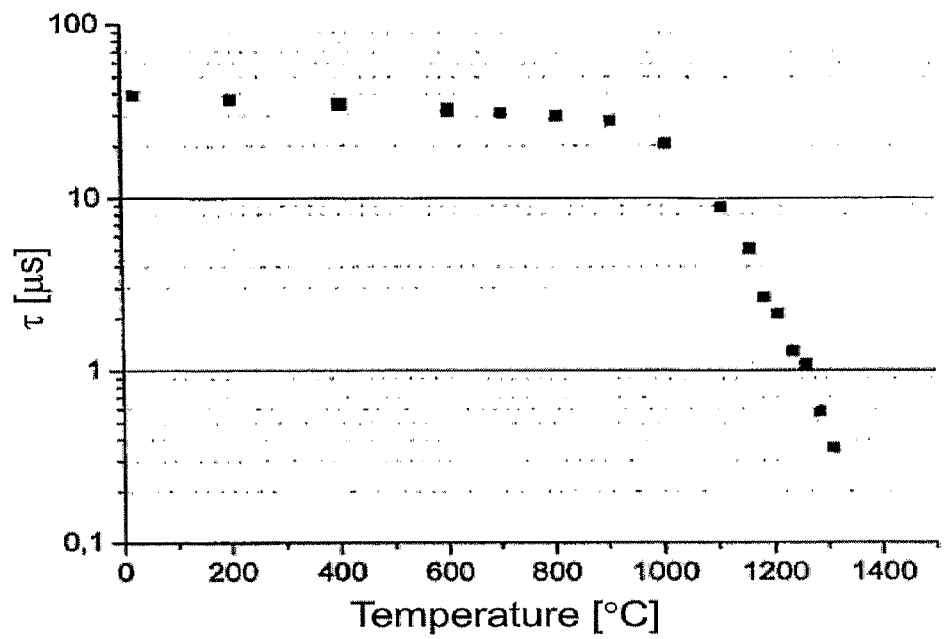
FIG. 7 illustrates a plot of the life-time decay as a function of temperature for the material composition of FIG. 5 as a plasma-sprayed coating and following annealing.

FIGS. 6 and 7 illustrate plots of the life-time decay as a function of temperature for this material composition for a powder and a coating as plasma sprayed and following annealing, where utilizing an excitation wavelength of 355 nm and observed at a wavelength of 455 nm. As is clearly illustrated, the exemplified material composition operates at markedly-increased temperatures of up to about 1500 C as compared to existing luminescent systems, with there being no difference in powders and coatings.

Example 1D

In this Example, a material composition is presented which comprises a YAG phase which is doped with Dy in an amount of 5 mol %.

In one embodiment, as in this embodiment, the doped YAG phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAG phase can be produced by solution chemistry, such as by the Pechini process or by urea precipitation.

In a further embodiment the doped YAG phase can be produced by a solid state reaction, in which a mixture of oxides or carbonates are heated to a high temperature.

Figure 8:
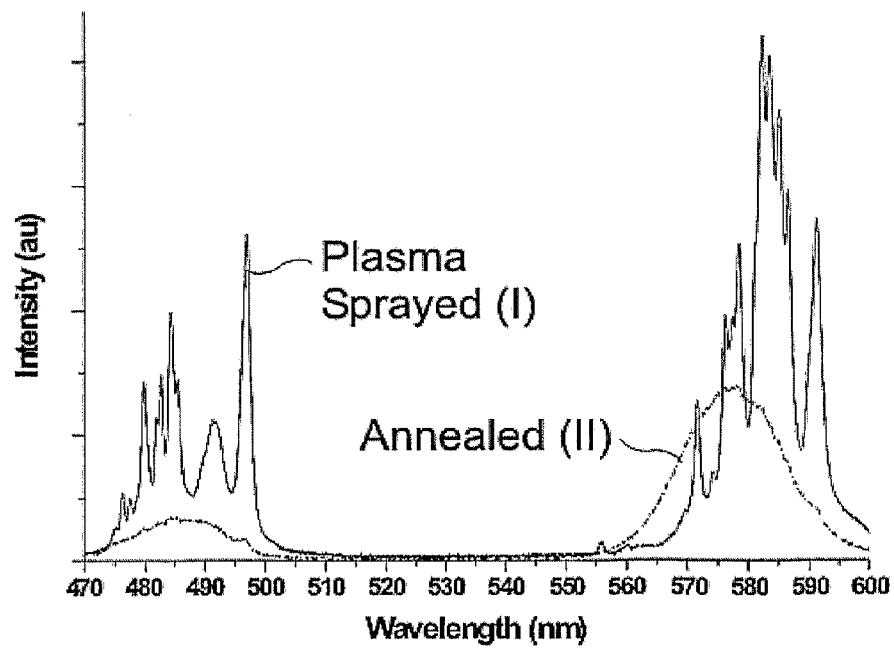
FIG. 8 illustrates the optical spectra for a material composition comprising a YAG host phase which is doped with Dy in an amount of 5 mol % as plasma sprayed (I) and following annealing (II)

FIG. 8 illustrates the optical spectra for this material composition as plasma sprayed (I) and subsequently annealed (II), where utilizing an excitation wavelength of 355 nm. As can be clearly observed, the material as plasma sprayed has an amorphous state, and, following annealing, the material has a crystalline state.

Figure 9:
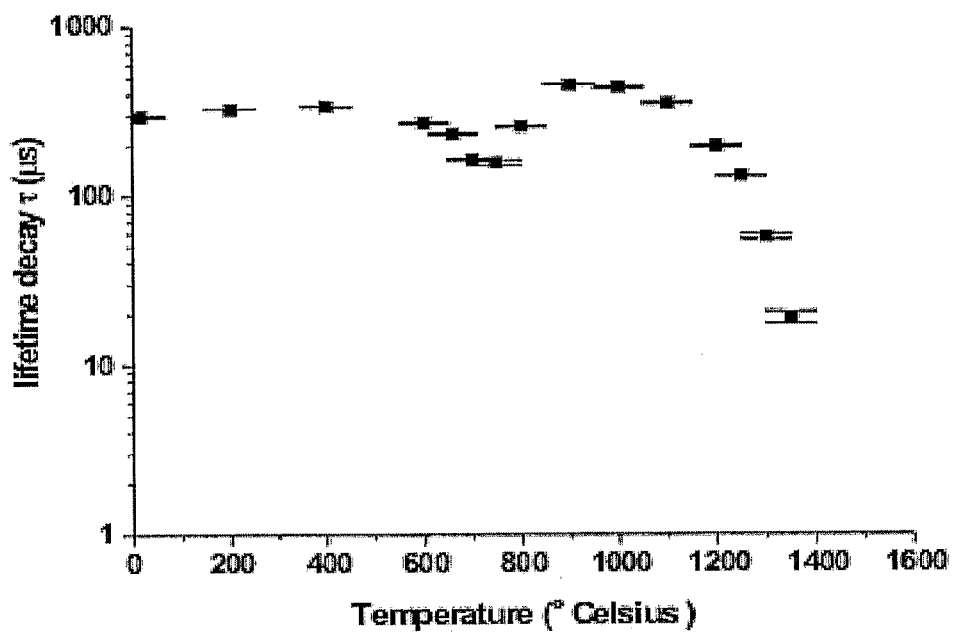
FIG. 9 illustrates a plot of the life-time decay as a function of temperature for the material composition of FIG. 8 as plasma sprayed and prior to annealing.

FIG. 9 illustrates a plot of the life-time decay as a function of temperature for this material composition as plasma sprayed and prior to annealing, where utilizing an excitation wavelength of 355 nm and observed at a wavelength of 581 nm. As will be observed, the life-time decay shows an intermediate dip, here at a temperature of about 700 C, which is indicative of the material not being fully crystalline.

Figure 10:
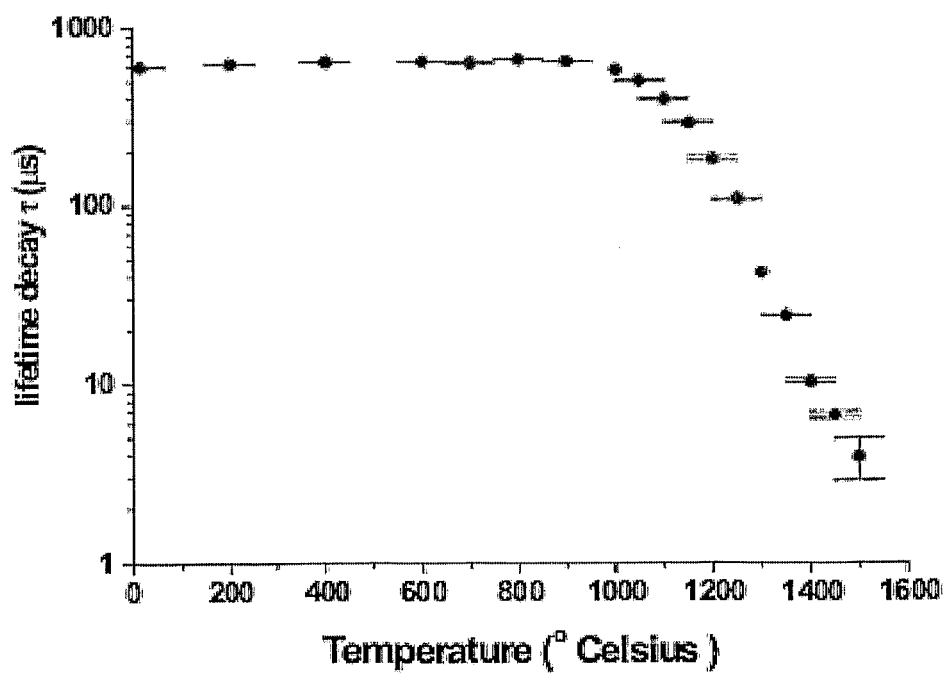
FIG. 10 illustrates a plot of the life-time decay as a function of temperature for the material composition of FIG. 8 following annealing.

FIG. 10 illustrates a plot of the life-time decay as a function of temperature for this material composition following annealing, where utilizing an excitation wavelength of 355 nm and observed at a wavelength of 580 nm. As is clearly illustrated, the exemplified material composition operates at markedly-increased temperatures of up to about 1500 C as compared to existing luminescent systems.

Example 1E

In this Example, a material composition is presented which comprises a YAG phase which is doped with Dy in an amount of 3 mol %.

In one embodiment, as in this embodiment, the doped YAG phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAG phase can be produced by solution chemistry, such as by the Pechini process or by urea precipitation.

In a further embodiment the doped YAG phase can be produced by a solid state reaction, in which a mixture of oxides or carbonates are heated to a high temperature.

Figure 11:
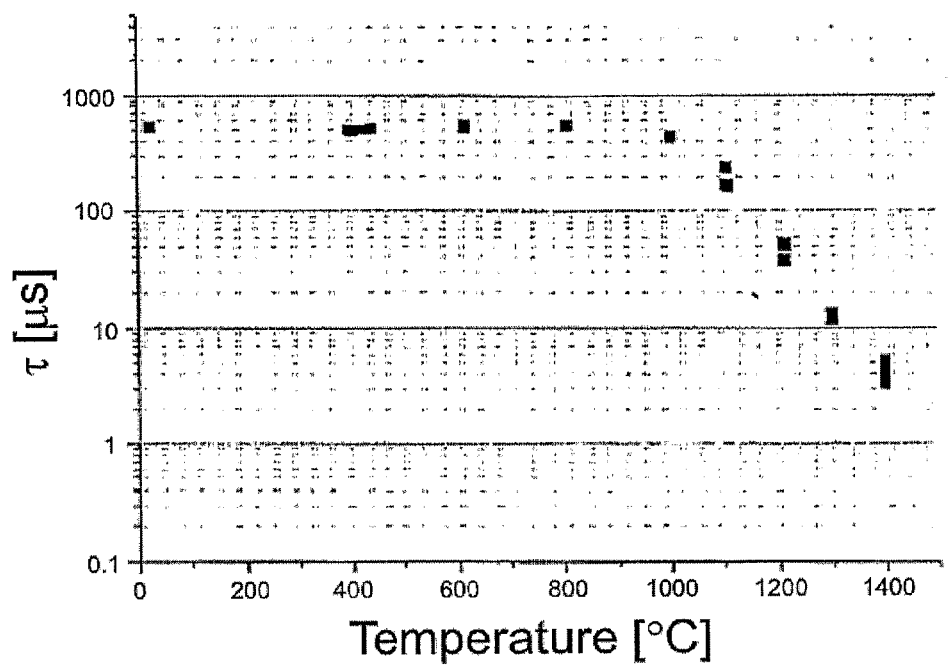
FIG. 11 illustrates a plot of the life-time decay as a function of temperature for a material composition comprising a YAG host phase which is doped with Dy in an amount of 3 mol % as plasma sprayed and following annealing.

FIG. 11 illustrates a plot of the life-time decay as a function of temperature for this material composition following annealing, where utilizing an excitation wavelength of 355 nm and observed at a wavelength of 580 nm. As is clearly illustrated, the exemplified material composition operates at markedly-increased temperatures of up to about 1400 C as compared to existing luminescent systems.

Example 1F

In this Example, a material composition is presented which comprises a YAG phase which is doped with Sm in an amount of 5 mol %.

In one embodiment the doped YAG phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAG phase can be produced by solution chemistry, such as by the Pechini process or by urea precipitation.

In a further embodiment the doped YAG phase can be produced by a solid state reaction, in which a mixture of oxides or carbonates are heated to a high temperature.

Figure 12:
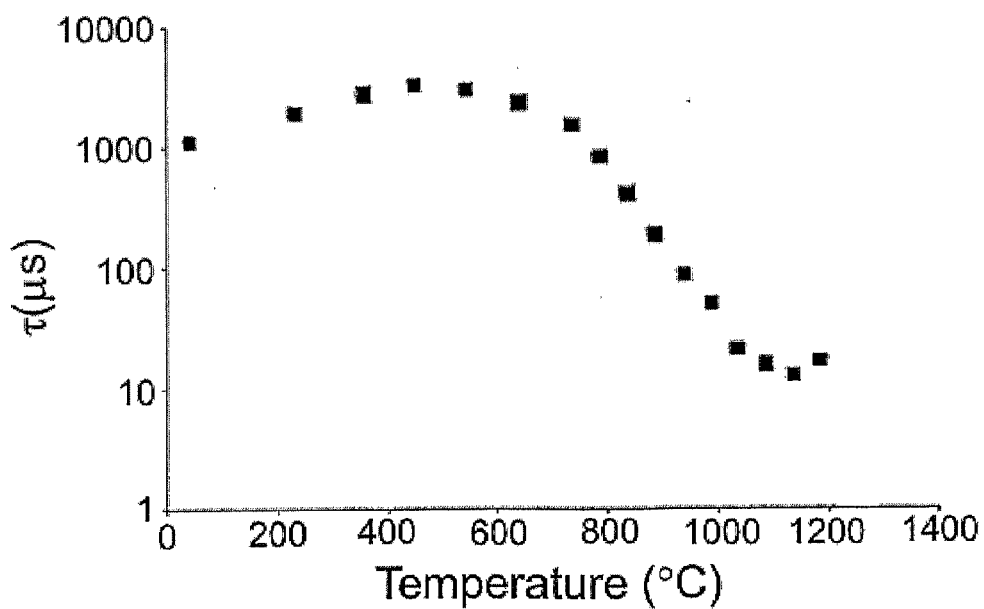
FIG. 12 illustrates a plot of the life-time decay as a function of temperature for a material composition comprising a YAG host phase which is doped with Sm in an amount of 5 mol % as plasma sprayed and following annealing.

FIG. 12 illustrates a plot of the life-time decay as a function of temperature for this material composition, where utilizing an excitation wavelength of 266 nm and observed at a wavelength of 622 nm. As is clearly illustrated, the exemplified material composition operates at markedly-increased temperatures of up to about 1200 C as compared to existing luminescent systems.

(b) YAP Material Compositions

In this aspect the present invention relates to a luminescent material composition comprising a YAP-based host phase and at least one luminescent dopant.

In one embodiment the YAP-based host phase comprises $YAlO_3$.

In one embodiment the at least one luminescent dopant comprises one or more elements selected from the lanthanide series.

In one embodiment the at least one luminescent dopant comprises one or more elements selected from Ce, Dy, Er, Eu, Gd, Ho, Nd, Pr, Sm, Tb, Tm and Yb.

In one embodiment the at least one luminescent dopant is doped in an amount of between 0.1 mol % and 6 mol %.

In another embodiment the at least one luminescent dopant is doped in an amount of between 0.1 mol % and 3 mol %.

In a further embodiment the at least one luminescent dopant is doped in an amount of about 0.3 mol %.

In a still further embodiment the at least one luminescent dopant is doped in an amount of about 1 mol %.

In one embodiment the luminescent material composition is incorporated in a structure, in a preferred embodiment as a coating, and more particularly as a thermal barrier coating.

In one embodiment the coating is a solid, continuous coating.

In another embodiment the coating is a paint coating.

In one embodiment the coating is a multi-layer coating, of which one layer comprises the luminescent material composition.

This embodiment of the present invention will now be described with reference to the following non-limiting Examples.

Example 2A

In this Example, a material composition is presented which comprises a YAP phase which is doped with Dy in an amount of 0.3 mol %.

In one embodiment, as in this embodiment, the doped YAP phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAP phase can be produced by solution chemistry, such as by the Pechini process or by urea precipitation.

In a further embodiment the doped YAP phase can be produced by a solid state reaction, in which a mixture of oxides or carbonates are heated to a high temperature.

Figure 13:
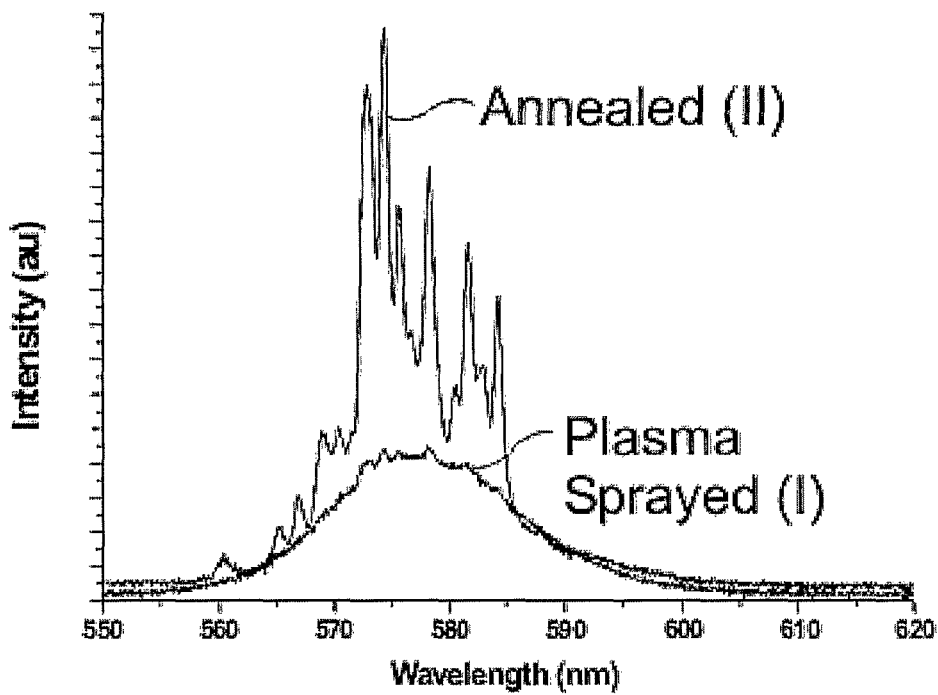
FIG. 13 illustrates the optical spectra for a material composition comprising a YAP host phase which is doped with Dy in an amount of 0.3 mol % as plasma sprayed (I) and following annealing (II)

FIG. 13 illustrates the optical spectra for this material composition as plasma sprayed (I) and subsequently annealed (II), where utilizing an excitation wavelength of 355 nm. As can be clearly observed, the material as plasma sprayed has an amorphous state, and, following annealing, the material has a crystalline state.

Figure 14:
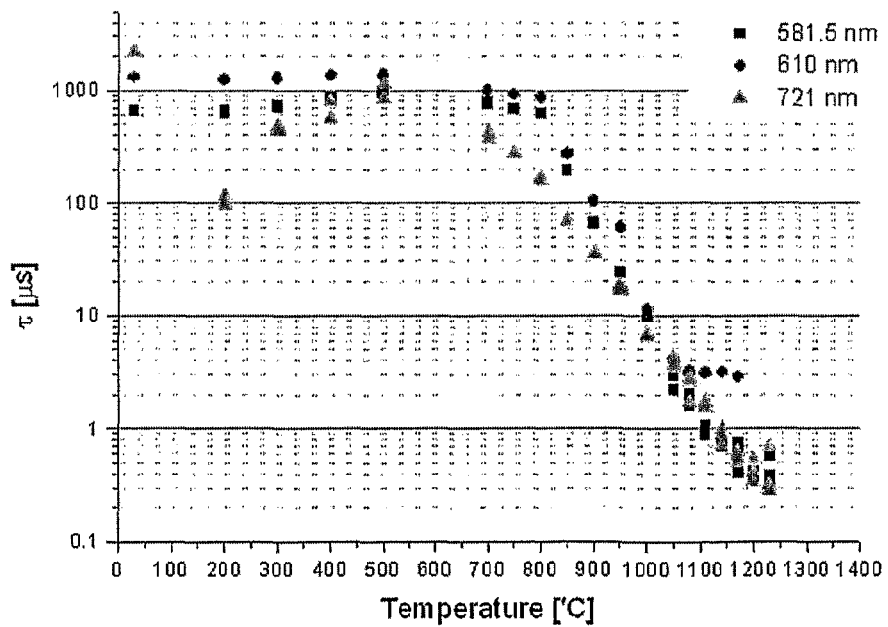
FIG. 14 illustrates a plot of the life-time decay as a function of temperature for the material composition of FIG. 13 following annealing.

FIG. 14 illustrates a plot of the life-time decay as a function of temperature for this material composition following annealing, where utilizing an excitation wavelength of 355 nm and observed at wavelengths of 581.5 nm, 610 nm and 721 nm. As is clearly illustrated, the exemplified material composition operates at markedly-increased temperatures of up to about 1250 C as compared to existing luminescent systems.

Example 2B

In this Example, a material composition is presented which comprises a YAP phase which is doped with Eu in an amount of 0.3 mol %.

In one embodiment, as in this embodiment, the doped YAP phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAP phase can be produced by solution chemistry, such as by the Pechini process or by urea precipitation.

In a further embodiment the doped YAP phase can be produced by a solid state reaction, in which a mixture of oxides or carbonates are heated to a high temperature.

Figure 15:
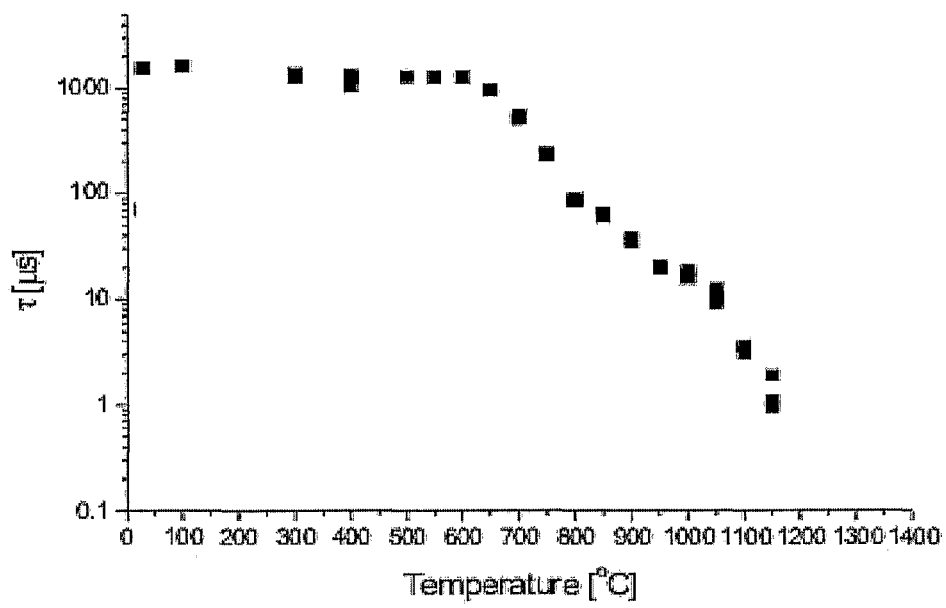
FIG. 15 illustrates a plot of the life-time decay as a function of temperature for a material composition comprising a YAP host phase which is doped with Eu in an amount of 0.3 mol % as plasma sprayed and following annealing.

FIG. 15 illustrates a plot of the life-time decay as a function of temperature for this material composition following annealing, where utilizing an excitation wavelength of 266 nm and observed at a wavelength of 622 nm. As is clearly

Example 2C

In this Example, a material composition is presented which comprises a YAP phase which is doped with Sm in an amount of 0.3 mol %.

In one embodiment, as in this embodiment, the doped YAP phase can be produced by plasma spraying, typically air plasma spraying, precursor powders. In this embodiment the material as plasma sprayed is not fully crystalline, and an annealing step is subsequently performed at a temperature above the crystallisation temperature, in this embodiment at 915 C, to cause crystallization.

In another embodiment the doped YAP phase can be produced by solution chemistry, such as by the Pechini process or by urea precipitation.

In a further embodiment the doped YAP phase can be produced by a solid state reaction, in which a mixture of oxides or carbonates are heated to a high temperature.

Figure 16:
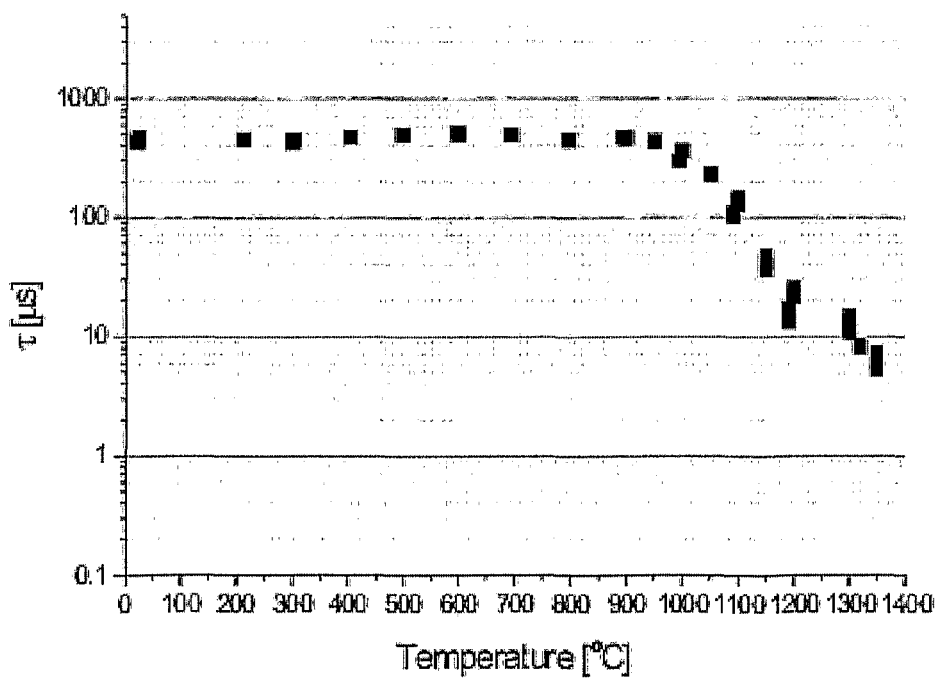
FIG. 16 illustrates a plot of the life-time decay as a function of temperature for a material composition comprising a YAP host phase which is doped with Sm in an amount of 0.3 mol % as plasma sprayed and following annealing.

FIG. 16 illustrates a plot of the life-time decay as a function of temperature for two measurements for this material composition following annealing, where utilizing an excitation wavelength of 266 nm and observed at a wavelength of 573 nm. As is clearly illustrated, the exemplified material composition operates at markedly-increased temperatures of up to about 1350 C as compared to existing luminescent systems.

(c) $GdAlO_3$ Material Compositions

In this aspect the present invention relates to a luminescent material composition comprising a $GdAlO_3$-based host phase and at least one luminescent dopant.

In one embodiment the $GdAlO_3$-based host phase comprises $GdAlO_3$.

In one embodiment the at least one luminescent dopant comprises one or more elements selected from the lanthanide series.

In one embodiment the at least one luminescent dopant comprises one or more elements selected from Ce, Dy, Er, Eu, Gd, Ho, Nd, Pr, Sm, Tb, Tm and Yb.

In one embodiment the at least one luminescent dopant is doped in an amount of between 0.1 mol % and 6 mol %.

In another embodiment the at least one luminescent dopant is doped in an amount of between 0.1 mol % and 3 mol %.

In a further embodiment the at least one luminescent dopant is doped in an amount of about 0.3 mol %.

In a still further embodiment the at least one luminescent dopant is doped in an amount of about 1 mol %.

In one embodiment the luminescent material composition is incorporated in a structure, in a preferred embodiment as a coating, and more particularly as a thermal barrier coating.

In one embodiment the coating is a solid, continuous coating.

In another embodiment the coating is a paint coating.

In one embodiment the coating is a multi-layer coating, of which one layer comprises the luminescent material composition.

This embodiment of the present invention will now be described with reference to the following non-limiting Examples.

Example 3A

In this Example, a material composition is presented which comprises a $GdAlO_3$ phase which is doped with Dy in an amount of 1 mol %.

In one embodiment, as in this embodiment, the doped $GdAlO_3$ phase can be produced by plasma spraying, typically air plasma spraying, precursor powders. In this embodiment the material as plasma sprayed is not fully crystalline, and an annealing step is subsequently performed at a temperature above the crystallisation temperature to cause crystallization.

In another embodiment the doped $GdAlO_3$ phase can be produced by solution chemistry, such as by the Pechini process or by urea precipitation.

In a further embodiment the doped $GdAlO_3$ phase can be produced by a solid state reaction, in which a mixture of oxides or carbonates are heated to a high temperature.

Figure 17:
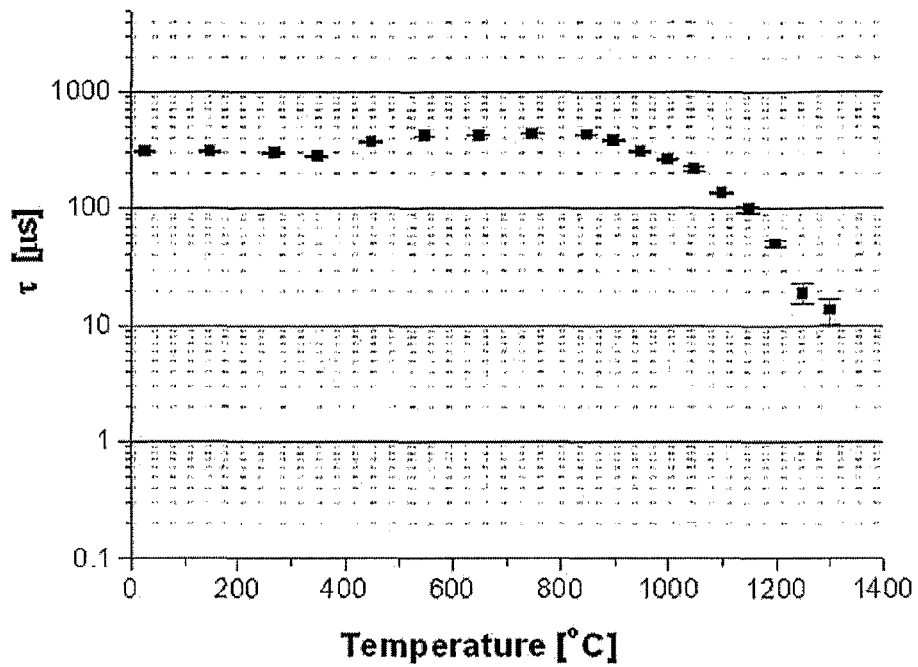
FIG. 17 illustrates a plot of the life-time decay as a function of temperature for a material composition comprising a GdAlO$_3$ host phase which is doped with Dy in an amount of 1 mol % as plasma sprayed and following annealing.

FIG. 17 illustrates a plot of the life-time decay as a function of temperature for this material composition following annealing, where utilizing an excitation wavelength of 355 nm and observed at a wavelength of 590.5 nm. As is clearly illustrated, the exemplified material composition operates at markedly-increased temperatures of up to at least about 1300 C as compared to existing luminescent systems.

Example 3B

In this Example, a material composition is presented which comprises a $GdAlO_3$ phase which is doped with Sm in an amount of 1 mol %.

In one embodiment, as in this embodiment, the doped $GdAlO_3$ phase can be produced by plasma spraying, typically air plasma spraying, precursor powders. In this embodiment the material as plasma sprayed is not fully crystalline, and an annealing step is subsequently performed at a temperature above the crystallisation temperature to cause crystallization.

In another embodiment the doped $GdAlO_3$ phase can be produced by solution chemistry, such as by the Pechini process or by urea precipitation.

In a further embodiment the doped $GdAlO_3$ phase can be produced by a solid state reaction, in which a mixture of oxides or carbonates are heated to a high temperature.

Figure 18:
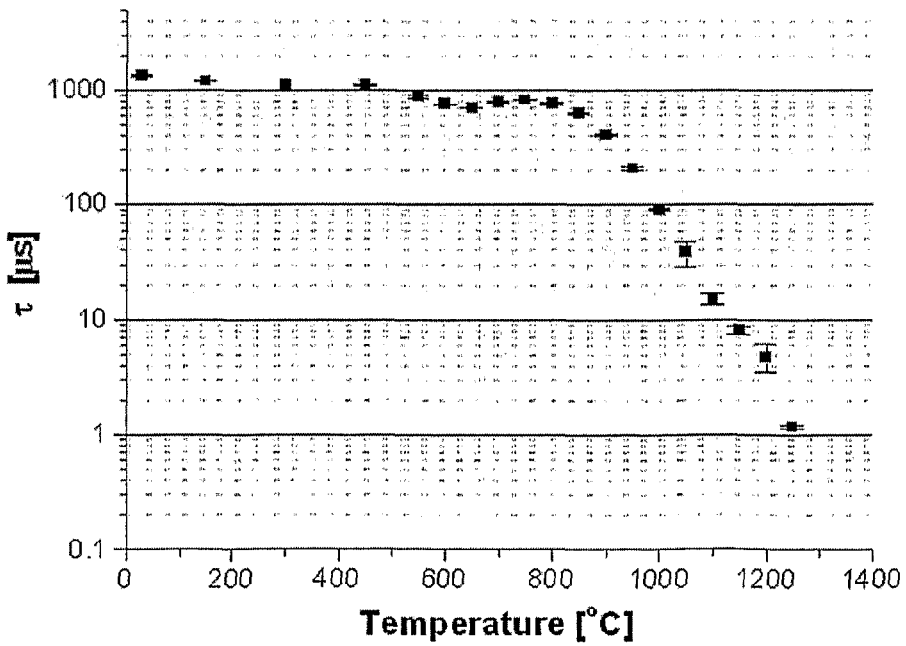
FIG. 18 illustrates a plot of the life-time decay as a function of temperature for a material composition comprising a GdAlO$_3$ host phase which is doped with Sm in an amount of 1 mol % as plasma sprayed and following annealing.

FIG. 18 illustrates a plot of the life-time decay as a function of temperature for this material composition following annealing, where utilizing an excitation wavelength of 266 nm and observed at a wavelength of 622 nm. As is clearly illustrated, the exemplified material composition operates at markedly-increased temperatures of up to at least about 1200 C as compared to existing luminescent systems.

(d) Pyrochlore Material Compositions

In this aspect the present invention relates to material compositions which comprise an $A_2B_2O_7$ (pyrochlore) host phase which is doped with at least one luminescent dopant selected from the elements Pr and Tb, where A comprises one or more elements from the lanthanide series (rare earth metals) or the actinide series and B comprises one or more elements from the group of transition metals.

In one embodiment the at least one luminescent dopant comprises Tb.

In another embodiment the at least one luminescent dopant comprises Pr.

In a further embodiment the at least one luminescent dopant comprises Pr and Tb in combination.

In one embodiment the host phase is doped with between 1 mol % and 10 mol % of the at least one luminescent dopant.

In another embodiment the host phase is doped with between 1 mol % and 7 mol % of the at least one luminescent dopant.

In a further embodiment the host phase is doped with between 3 mol % and 7 mol % of the at least one luminescent dopant.

In a still further embodiment the host phase is doped with between 4 mol % and 6 mol % of the at least one luminescent dopant.

In a yet further embodiment the host phase is doped with about 5 mol % of the at least one luminescent dopant.

This embodiment of the present invention will now be described with reference to the following non-limiting Example.

Example 4

In this Example, three material compositions are presented which comprise an $La_2Zr_2O_7$ (pyrochlore) host phase which is doped with Tb in an amount of 1 mol %, 5 mol % and 10 mol %.

Figure 19:
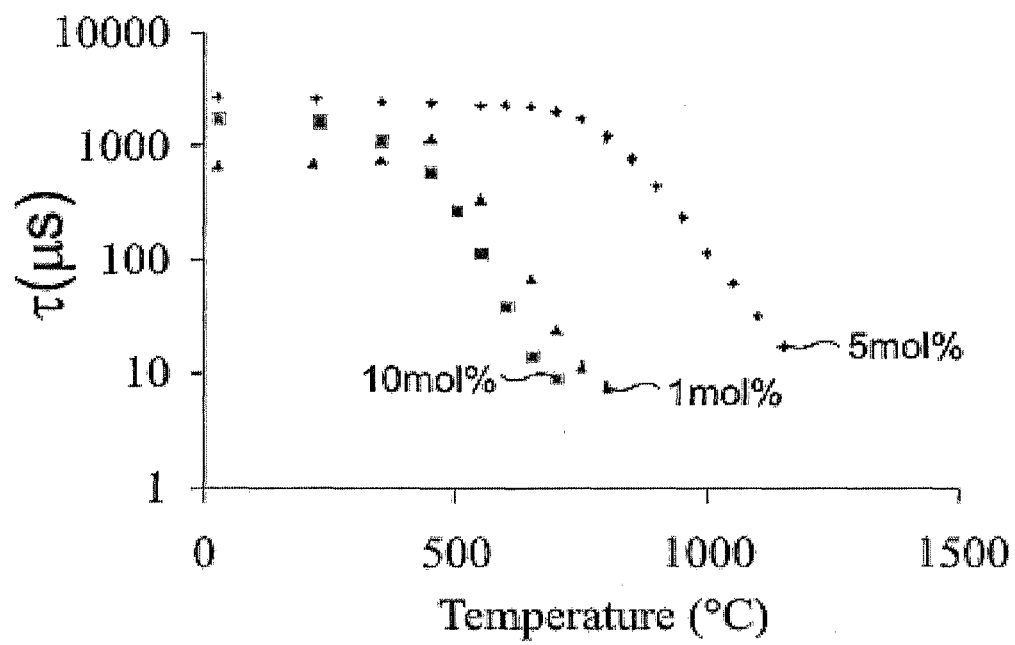
FIG. 19 illustrates a plot of the life-time decay as a function of temperature for material compositions comprising an La$_2$Zr$_2$O$_7$ (pyrochlore) host phase which is doped with Tb in an amount of 1 mol %, 5 mol % and 10 mol %.

FIG. 19 illustrates a plot of the life-time decay for these material compositions as a function of temperature, where utilizing an excitation wavelength of 266 nm and observed at a wavelength of 543 nm. As is clearly illustrated, the material composition which is doped with 5 mol % Tb surprisingly operates at markedly-increased temperatures of up to about 1200 C, whereas the material compositions which are doped with 1 mol % Tb and 10 mol % Tb only operate up to temperatures of about 800 C.

For comparison, FIG. 20 illustrates a plot of the life-time decay as a function of temperature for the same material compositions which are doped with Tb in an amount of 5 mol % and 10 mol %, where utilizing an excitation wavelength of 266 nm and observed at a wavelength of 543 nm, a composition comprising an $La_2Zr_2O_7$ (pyrochlore) host phase which is doped with Eu in an amount of 5 mol %, where utilizing an excitation wavelength of 266 nm and observed at a wavelength of 543 nm, and a material composition comprising an $La_2Zr_2O_7$ (pyrochlore) host phase which is doped with Dy in an amount of 10 mol %, where utilizing an excitation wavelength of 355 nm and observed at wavelengths of 455 nm and 582 nm.

As is clearly illustrated in FIG. 20, an equivalent amount of another lanthanide dopant, namely Eu, does not provide the same effect as the Tb dopant. Indeed, that material composition is capable of operating at temperatures of only up to about 650 C.

(II) MULTI-PHASE MATERIALS

In this aspect the present invention relates to luminescent material compositions which comprise a plurality of separate, discrete phases, at least one of which is luminescent and can comprise any of the above-described single-phase materials.

FIG. 21 schematically represents a structure in accordance with a preferred embodiment of the present invention.

In this embodiment the structure 3 is a coating, here a TBC, as applied to a component 5, which typically operates in high-temperature environments.

The structure 3 comprises a luminescent material composition comprising a first, structural or matrix phase 3a, and a second, luminescent phase 3b which is distributed within the matrix phase 3a.

In one embodiment the structural phase 3a comprises a zirconia-based phase.

In one embodiment the zirconia-based phase comprises yttria stabilized zirconia (YSZ).

In another embodiment the zirconia-based phase comprises partially stabilized zirconia In a further embodiment the zirconia-based phase comprises zirconia stabilized with from about 3 mol % to about 6 mol % yttria, and preferably 4 mol % yttria, which is a t' structure.

In a still further embodiment the zirconia-based phase comprises zirconia stabilized with from about 6 mol % to about 10 mol % yttria, and preferably 8 mol % yttria, which is a cubic structure.

In one embodiment the zirconia-based phase includes at least one luminescent dopant.

In one embodiment the at least one luminescent dopant comprises one or more elements selected from the lanthanide series.

In one embodiment the lanthanide dopant comprises a single dopant selected from the elements Ce, Dy, Er, Eu, Gd, Ho, Nd, Pr, Sm, Tb, Tm and Yb.

In another embodiment the lanthanide dopant comprises a pair of dopants selected from the pairs of elements Gd and Er, Gd and Nd, Gd and Yb, Yb and Nd and Yb and Sm.

In a yet further embodiment the zirconia-based phase comprises a zirconate pyrochlore ($A_2Zr_2O_7$), where A is preferably one or more elements selected from the lanthanide series.

In one embodiment A comprises one or more of the elements Gd, La, Nd and Sm.

In one embodiment the luminescent phase 3b comprises a host phase which contains Y and Al.

In one embodiment the luminescent phase 3b comprises a host phase which includes yttria and an aluminate.

In another embodiment the luminescent phase 3b comprises a YAG-based host phase.

In one embodiment the YAG-based phase comprises $Y_3Al_5O_{12}$.

In another embodiment the YAG-based phase comprises $Y_3Al_xFe_{5-x}O_2$, where X>0.

In one embodiment the YAG-based phase includes at least one luminescent dopant.

In one embodiment the at least one luminescent dopant comprises one or more elements selected from the lanthanide series.

In one embodiment the at least one luminescent dopant comprises one or more elements selected from Ce, Dy, Er, Eu, Gd, Ho, Nd, Pr, Sm, Tb, Tm and Yb.

In one embodiment the at least one luminescent dopant is doped in an amount of between 0.1 mol % and 6 mol %.

In another embodiment the at least one luminescent dopant is doped in an amount of between 0.5 mol % and 6 mol %.

In a further embodiment the at least one luminescent dopant is doped in an amount of between 3 mol % and 6 mol %.

In a still further embodiment the at least one luminescent dopant is doped in an amount of between 4.5 mol % and 5.5 mol %.

In a yet further embodiment the at least one luminescent dopant is doped in an amount of about 3 mol %.

In a still yet further embodiment the at least one luminescent dopant is doped in an amount of about 5 mol %.

In a further embodiment the luminescent phase 3b comprises a YAP-based host phase.

In one embodiment the YAP-based phase comprises $YAlO_3$.

In one embodiment the at least one luminescent dopant comprises one or more elements selected from the lanthanide series.

In one embodiment the at least one luminescent dopant comprises one or more elements selected from Ce, Dy, Er, Eu, Gd, Ho, Nd, Pr, Sm, Tb, Tm and Yb.

In one embodiment the at least one luminescent dopant is doped in an amount of between 0.1 mol % and 6 mol %.

In another embodiment the at least one luminescent dopant is doped in an amount of between 0.1 mol % and 3 mol %.

In a further embodiment the at least one luminescent dopant is doped in an amount of about 0.3 mol %.

In a still further embodiment the at least one luminescent dopant is doped in an amount of about 1 mol %.

In a still further embodiment the luminescent phase 3b comprises a GdAlO$_3$-based host phase.

In one embodiment the GdAlO$_3$-based phase comprises GdAlO$_3$.

In one embodiment the GdAlO$_3$-based phase includes at least one luminescent dopant.

In one embodiment the at least one luminescent dopant comprises one or more elements selected from the lanthanide series.

In one embodiment the at least one luminescent dopant comprises one or more elements selected from Ce, Dy, Er, Eu, Gd, Ho, Nd, Pr, Sm, Tb, Tm and Yb.

In one embodiment the at least one luminescent dopant is doped in an amount of between 0.1 mol % and 6 mol %.

In another embodiment the at least one luminescent dopant is doped in an amount of between 0.1 mol % and 3 mol %.

In a further embodiment the at least one luminescent dopant is doped in an amount of about 0.3 mol %.

In a still further embodiment the at least one luminescent dopant is doped in an amount of about 1 mol %.

In yet another embodiment the luminescent phase 3b comprises an A$_2$B$_2$O$_7$ (pyrochlore) host phase, where A comprises one or more elements selected from the lanthanide series or the actinide series and B comprises one or more elements selected from the group of transition metals.

In one embodiment A comprises one or more of the elements Gd, La, Nd and Sm.

In another embodiment B comprises the element Zr.

In one embodiment the pyrochlore phase includes at least one luminescent dopant.

In one embodiment the at least one luminescent dopant is selected from Pr and Tb.

In one embodiment the at least one luminescent dopant comprises Tb.

In another embodiment the at least one luminescent dopant comprises Pr.

In a further embodiment the at least one luminescent dopant comprises Pr and Tb in combination.

In one embodiment the pyrochlore phase is doped with between 1 mol % and 10 mol % of the at least one luminescent dopant.

In another embodiment the pyrochlore phase is doped with between 1 mol % and 7 mol % of the at least one luminescent dopant.

In a further embodiment the pyrochlore phase is doped with between 3 mol % and 7 mol % of the at least one luminescent dopant.

In a still further embodiment the pyrochlore phase is doped with between 4 mol % and 6 mol % of the at least one luminescent dopant.

In a yet further embodiment the pyrochlore phase is doped with about 5 mol % of the at least one luminescent dopant.

In still yet another embodiment the luminescent phase 3b comprises an yttria-based host phase.

In one embodiment the yttria-based phase comprises yttria.

In one embodiment the yttria-based phase includes at least one luminescent dopant.

In one embodiment the at least one luminescent dopant comprises one or more elements selected from the lanthanide series.

In one embodiment the at least one luminescent dopant comprises one or more elements selected from Ce, Dy, Er, Eu, Gd, Ho, Nd, Pr, Sm, Tb, Tm and Yb.

In another embodiment the at least one luminescent dopant is doped in an amount of between 0.1 mol % and 6 mol %.

In a further embodiment the at least one luminescent dopant is doped in an amount of between 0.5 mol % and 6 mol %.

In a still further embodiment the at least one luminescent dopant is doped in an amount of between 3 mol % and 6 mol %.

In a yet further embodiment the at least one luminescent dopant is doped in an amount of between 4.5 mol % and 5.5 mol %.

In still another embodiment the at least one luminescent dopant is doped in an amount of about 3 mol %.

In a still yet further embodiment the at least one luminescent dopant is doped in an amount of about 5 mol %.

In one embodiment the luminescent phase 3b comprises a plurality of separate, discrete atomic clusters or particles which are distributed within the structural phase 3a and act, when excited by an excitation signal, to emit a luminescence signal which is representative of one or more characteristics of the structure, in particular environmental characteristics, such as temperature.

In one embodiment the clusters or particles are clusters or particles which are able to co-exist in the structural phase 3a, preferably at temperatures exceeding 1000 C.

In one embodiment the size and distribution of the clusters or particles is such as not significantly to alter the physical or chemical characteristics of the structural phase 3a, but yet sufficient to provide a luminescence signal.

In one embodiment the clusters or particles have a generally uniform shape.

In one embodiment the clusters or particles are of an average size between 1 nm and 5 μm.

In another embodiment the clusters or particles are of an average size between 1 nm and 2 μm.

In a further embodiment the clusters or particles are of an average size between 1 nm and 1 μm.

In a still further embodiment the clusters or particles are of an average size between 1 nm and 100 nm.

In a yet further embodiment the clusters or particles are of an average size between 1 nm and 50 nm.

In yet another embodiment the clusters or particles are of an average size between 20 nm and 50 nm.

In still another embodiment the clusters or particles are of an average size between 1 nm and 20 nm.

In still yet another embodiment the clusters or particles are of an average size between 1 nm and 10 nm.

In another embodiment the clusters or particles have an asymmetric shape.

In one embodiment the clusters or particles have an elongate or ribbon shape.

In one embodiment the clusters or particles have an average length of less than about 150 μm.

In another embodiment the clusters or particles have an average length of less than about 100 μm.

In a further embodiment the clusters or particles have an average length of less than about 50 μm.

In one embodiment the clusters or particles have an average thickness of less than about 20 μm.

In another embodiment the clusters or particles have an average thickness of less than about 10 μm.

In a further embodiment the clusters or particles have an average thickness of less than about 5 μm.

In one embodiment the structure 3 contains the second phase in an amount between 0.1 wt % and 50 wt %.

In another embodiment the structure 3 contains the second phase in an amount between 0.1 wt % and 20 wt %.

In a further embodiment the structure 3 contains the second phase in an amount between 0.1 wt % and 10 wt %.

In a still further embodiment the structure 3 contains the second phase in an amount between 0.1 wt % and 5 wt %.

In a yet further embodiment the structure 3 contains the second phase in an amount between 0.1 wt % and 2 wt %.

In yet another embodiment the structure 3 contains the second phase in an amount between 0.1 wt % and 1 wt %.

In one embodiment the luminescent phase 3b is a substantially crystalline phase.

In another embodiment the luminescent phase 3b is at least partially an amorphous phase.

In a further embodiment the luminescent phase 3b is an amorphous phase.

In one embodiment the luminescent phase 3b is a phase which is chemically and physically stable at temperatures of up to about 1700 C, and preferably when thermally cycled.

In one embodiment the structure 3 is plasma sprayed from precursor powders of the first, matrix phase and the second phase.

In another embodiment the structure 3 is formed by co-precipitation from a solution containing precursor materials in stoichiometric amounts.

In one embodiment the structure 3 could be a multi-layer coating, one layer of which includes the luminescent phase 3b.

In one embodiment the structure 3 comprises a first, lower layer which comprises substantially only the structural phase 3a, and a second, upper layer which comprises the structural phase 3a and the luminescent phase 3b distributed therewithin.

In one embodiment the coating is a solid, continuous coating.

In one embodiment a bondcoat, for example, of $Al_2O_3$, can be incorporated at the surface of the component 5, such as to promote adhesion of the structure 3 to the component 5. In one embodiment an $Al_2O_3$ can be formed by thermal growth from an alloy, for example, MCrAlY (where M is a metal), or an intermetallic compound, for example, platinum aluminide.

These embodiments of the present invention will now be described with reference to the following non-limiting Examples.

Example 5A

In this Example, a material composition is presented which comprises 95 wt % of a YSZ matrix phase and 5 wt % of a YAG-based second, luminescent phase which is doped with Tb in an amount of 5 mol %.

In this embodiment the doped YAG phase is produced by a solid state reaction, in which a mixture of oxides or carbonates are heated to a high temperature.

In another embodiment the doped YAG phase could be produced by solution chemistry, such as by the Pechini process or by urea precipitation, where the material components are co-precipitated from a solution of precursor materials in stoichiometric proportions.

FIG. 22 illustrates an XRD pattern for this material composition, with the XRD pattern showing the first, YSZ matrix phase and a second, discrete YAG-based phase. Peaks at 25.59, 26.94, 28.82, 32.82, 39.02, 40.10, 43.37 and 44.82, which characterize the material composition, have to date not been attributed.

FIG. 23 illustrates a plot of the life-time decay as a function of temperature for this material composition and a material composition comprising a YAG host phase which is doped with Tb in an amount of 5 mol %, where both utilizing an excitation wavelength of 266 nm and observed at a wavelength of 543 nm. As is clearly illustrated, the exemplified material composition operates at markedly-increased temperatures of up to about 1200 C as compared to existing luminescence systems, which can also be contrasted with a YSZ host phase where doped to the same amount.

Example 5B

In this Example, a material composition is presented which comprises 95 wt % of a YSZ matrix phase and 5 wt % of a YAG-based second, luminescent phase which is doped with Eu in an amount of 5 mol % on the Y site.

In this embodiment the doped YAG phase is produced by a solid state reaction, in which a mixture of oxides or carbonates are heated to a high temperature.

In another embodiment the doped YAG phase could be produced by solution chemistry, such as by the Pechini process or by urea precipitation, where the material components are co-precipitated from a solution of precursor materials in stoichiometric proportions.

FIG. 24 illustrates a plot of the life-time decay as a function of temperature for this material composition and a material composition comprising a YAG host phase which is doped with Eu in an amount of 5 mol %, where both utilizing an excitation wavelength of 266 nm and observed at a wavelength of 611 nm. As is clearly illustrated, the exemplified material composition operates at markedly-increased temperatures of up to about 1250 C as compared to existing luminescent systems, and the luminescence properties of the luminescent phase are not degraded as compared to the luminescent phase where utilized as a single phase.

Example 5C

In this Example, a material composition is presented which comprises 95 wt % of a YSZ matrix phase and 5 wt % of a YAG-based second, luminescent phase which is doped with Dy in an amount of 5 mol %.

In this embodiment the doped YAG phase is produced by solution chemistry, such as by the Pechini process or by urea precipitation, where the material components are co-precipitated from a solution of precursor materials in stoichiometric proportions.

In another embodiment the doped YAG phase could be produced by a solid state reaction, in which a mixture of oxides or carbonates are heated to a high temperature.

FIG. 25 illustrates a high-resolution scanning electron micrograph (SEM) of this material composition. This SEM shows the two phases, where the YSZ phase comprises the larger particles, which have an average size of between about 100 nm and about 200 nm, and the doped YAG phase comprises the smaller, nanoparticles, which have an average size of between about 20 nm and about 50 nm, and are located substantially at the interstices of the larger YSZ particles.

FIG. 26 illustrates the optical spectra for the YAG-based luminescent phase of this material composition (I) and, for purposes of comparison, a YAG-based luminescent material composition which is doped with Dy in an amount of 3 mol % and formed separately as a discrete, single phase (II). As can be clearly observed, the YAG-based luminescent phase of this material composition has an amorphous state, which is in marked contrast to the crystalline state of a separately-formed YAG-based luminescent material composition.

Example 5D

In this Example, a material composition is presented which comprises 95 wt % of a YSZ matrix phase and 5 wt % of a YAG-based second, luminescent phase which is doped with Dy in an amount of 3 mol %.

In this embodiment the doped YAG phase is produced by solution chemistry, such as by the Pechini process or by urea precipitation, where the material components are co-precipitated from a solution of precursor materials in stoichiometric proportions.

In another embodiment the doped YAG phase could be produced by a solid state reaction, in which a mixture of oxides or carbonates are heated to a high temperature.

Figure 27:
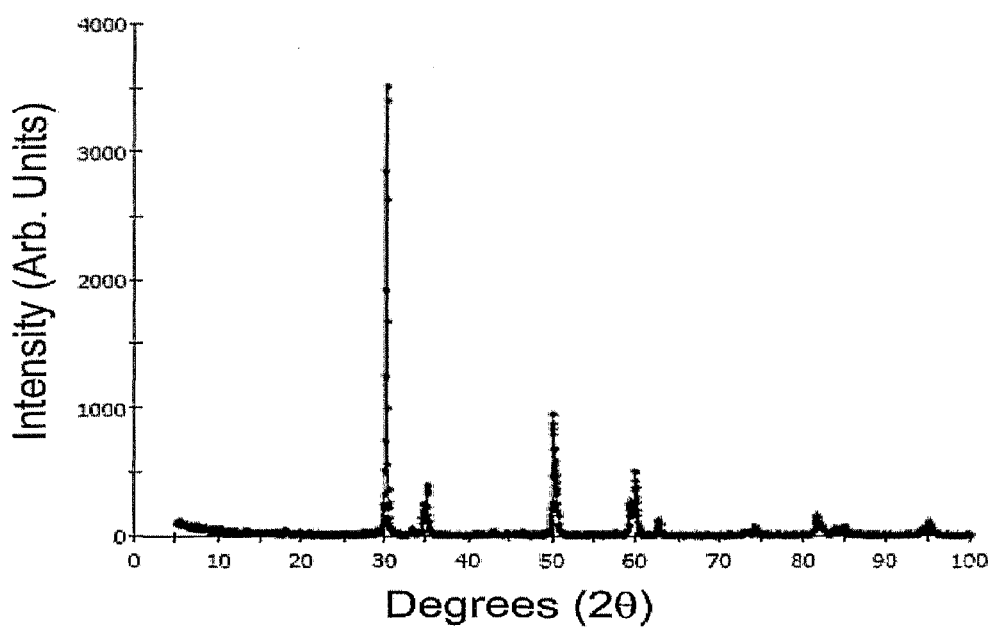
Figure 28:
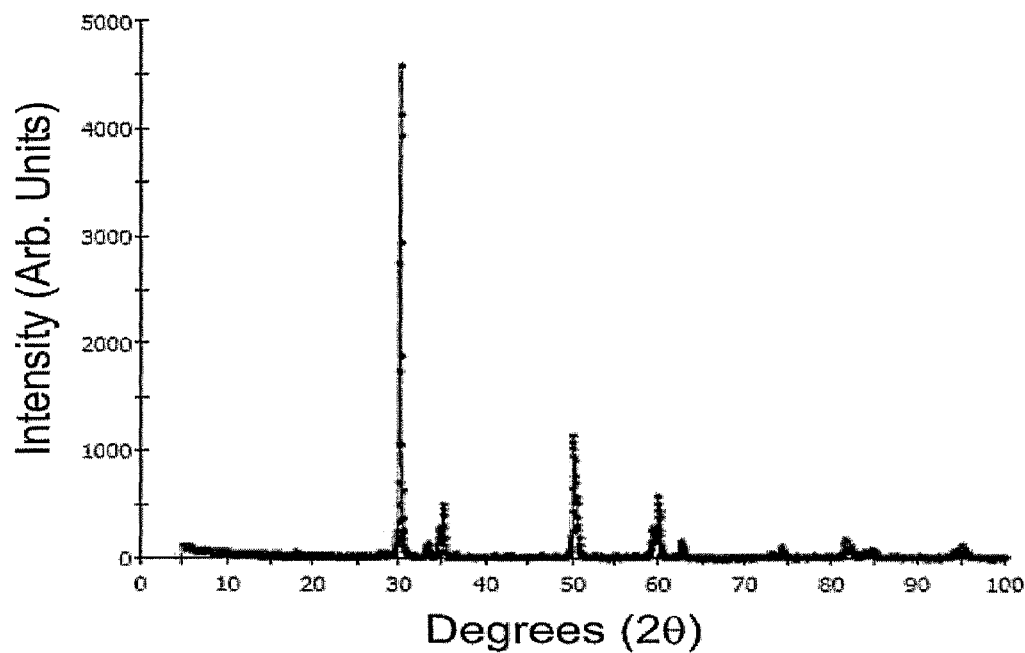

FIGS. 27 to 30 illustrate XRD patterns for this material composition, with the XRD patterns showing the first, YSZ matrix phase and the second, discrete YAG-based luminescent phase. FIG. 27 illustrates the XRD pattern for the material composition at room temperature. FIG. 28 illustrates the XRD pattern for the material composition following a heat treatment at 1200 C for 2 hours. FIG. 29 illustrates the XRD pattern for the material composition following two separate heat treatments at 1200 C for 12 hours. FIG. 30 illustrates the XRD pattern for the material composition following a first heat treatment at 1200 C for 24 hours and a second heat treatment at 1400 C for 12 hours.

FIGS. 27 to 30 clearly illustrate the stability of the second, YAG-based luminescent phase when subjected to high temperatures.

FIG. 31 illustrates a plot of the life-time decay as a function of temperature for this material composition as prepared by the precipitation route (I) and subsequent to being subjected to thermal cycling to 1200 C (II), where both utilizing an excitation wavelength of 355 nm and observed at a wavelength of 581 nm.

As will also be observed, the life-time decays each show an intermediate dip, here at a temperature of about 600 C. This intermediate dip is indicative of the material not being fully crystalline and being at least partly amorphous, but the repeatability of the life-time decay following thermal cycling to a temperature exceeding the crystallization temperature of the doped YAG phase indicates that this phase has a stable structure.

FIG. 32 illustrates a plot of the life-time decay as a function of temperature for a material composition comprising 95 wt % of a YSZ matrix phase and 5 wt % of a YAG-based luminescent phase which is doped with Dy in an amount of 3 mol % as prepared by the precipitation route and subsequent to being subjected to thermal cycling. This material composition exhibits a similar intermediate dip in the life-time decay. As is clearly illustrated, the exemplified material composition operates at markedly-increased temperatures of up to about 1400 C as compared to existing luminescent systems.

Example 5E

In this Example, a material composition is presented which comprises 90 wt % of a YSZ matrix phase and 10 wt % of a YAG-based second, luminescent phase which is doped with Dy in an amount of 3 mol % on the Y site.

In this embodiment the material composition is produced, here as a coating, by plasma spraying, typically air plasma spraying, precursor powders, here substantially spherical particles having a particle size distribution of from about 20 μm to about 80 μm. In this embodiment the material as plasma sprayed is not fully crystalline, and an annealing step is subsequently performed at a temperature above the crystallisation temperature, in this embodiment at 915 C, to cause crystallization.

FIGS. 33 and 34 illustrate XRD patterns for this material composition as sprayed and following annealing, respectively. The XRD pattern of FIG. 33 shows a crystalline YSZ matrix phase, but shows a non-crystalline YAG phase, as represented by the background intensity at 2θ angles of about 30 degrees and between about 40 and about 60 degrees. This XRD pattern can be contrasted with that of FIG. 34 which shows a crystalline YSZ matrix phase and a crystalline YAG phase.

In the XRD pattern of FIG. 33, the 2θ peaks are located at angles 18.0048, 27.7008, 28.1641, 30.1321, 33.2566, 34.7211, 35.0479, 36.5325, 41.0334, 42.9965, 46.4882, 50.2383, 50.5156, 52.7092, 55.0006, 55.1489, 56.1425, 56.2944, 57.2890, 57.4446, 59.4470, 59.6096, 59.8948, 60.0589, 62.7009, 62.8744, 68.4005, 73.2759 and 74.1075.

In the XRD pattern of FIG. 34, the 2θ peaks are located at angles 17.9999, 20.8402, 27.7064, 28.1354, 30.0268, 33.2742, 34.7830, 35.0720, 36.5637, 38.1282, 41.0802, 42.4897, 43.0029, 44.3998, 46.5320, 50.1146, 52.7430, 55.0726, 56.2351, 57.3247, 59.4893, 59.9469, 61.7002, 62.4732, 62.6866, 69.9849, 71.9636, 73.1842, 73.5804 and 74.1893.

FIG. 35 illustrates a sectional scanning electron micrograph (SEM) of this material composition. This SEM shows the two phases, where the YSZ phase comprises the lighter, matrix phase, and the doped YAG phase comprises the darker, elongate or ribbon particles, which have an average length of less than about 200 μm in a direction parallel to the surface of the coating and an average thickness of less than about 5 μm in a direction orthogonal to the surface of the coating.

In this embodiment the YAG particles constitute splats which result from the impact of the molten YAG-based particles which are delivered by the plasma spraying apparatus and solidify rapidly into this form.

In this embodiment the YAG-based particles are substantially uniformly distributed throughout the coating.

Example 5F

In this Example, a material composition is presented which comprises 95 wt % of a YSZ matrix phase and 5 wt % of a YAG-based second, luminescent phase which is doped with Eu in an amount of 5 mol % on the Y site.

In this embodiment the material composition is produced, here as a coating, by plasma spraying, typically air plasma spraying, precursor powders, here substantially spherical particles having a particle size distribution of from about 20 μm to about 80 μm. In this embodiment the material as plasma sprayed is not fully crystalline, and an annealing step is subsequently performed at a temperature above the crystallisation temperature, in this embodiment at 915 C, to cause crystallization.

FIG. 36 illustrates a sectional scanning electron micrograph (SEM) of this material composition. This SEM shows the two phases, where the YSZ phase comprises the lighter, matrix phase, and the doped YAG phase comprises the darker, elongate or ribbon particles, which have an average length of less than about 100 μm in a direction parallel to the surface of the coating and an average thickness of less than about 10 μm in a direction orthogonal to the surface of the coating.

In this embodiment the YAG particles constitute splats which result from the impact of the molten YAG-based particles which are delivered by the plasma spraying apparatus and solidify rapidly into this form.

In this embodiment the coating is a multi-layer coating which comprises a first, lower layer which comprises only the YSZ matrix phase, here having a thickness of less than about 250 μm, and a second, upper layer which comprises the YSZ matrix phase and the YAG-based particles distributed therewithin, here substantially uniformly, and having a thickness of less than about 150 μm.

Example 5G

In this Example, a material composition is presented which comprises 80 wt % of a YSZ matrix phase and 20 wt % of a YAG-based second, luminescent phase which is doped with Tm in an amount of 0.5 mol % on the Y site.

In this embodiment the material composition is produced, here as a coating, by plasma spraying, typically air plasma spraying, precursor powders, here substantially spherical particles having a particle size distribution of from about 20 μm to about 80 μm. In this embodiment the material as plasma sprayed is not fully crystalline, and an annealing step is subsequently performed at a temperature above the crystallisation temperature, in this embodiment at 915 C, to cause crystallization.

FIG. 37 illustrates a sectional scanning electron micrograph (SEM) of this material composition. This SEM shows the two phases, where the YSZ phase comprises the lighter, matrix phase, and the doped YAG phase comprises the darker, elongate or ribbon particles, which have an average length of less than about 150 μm in a direction parallel to the surface of the coating and an average thickness of less than about 20 μm in a direction orthogonal to the surface of the coating.

In this embodiment the YAG particles constitute splats which result from the impact of the molten YAG-based particles which are delivered by the plasma spraying apparatus and solidify rapidly into this form.

In this embodiment the coating is a multi-layer coating which comprises a first, lower layer which comprises only the YSZ matrix phase, here having a thickness of less than about 250 μm, and a second, upper layer which comprises the YSZ matrix phase and the YAG-based particles distributed therewithin, here substantially uniformly, and having a thickness of less than about 100 μm.

The performance of the material compositions of this embodiment of the present invention is particularly surprising, insofar as the state of the art, as, for example, disclosed in Surface & Coatings Technology 188-189 (2004), pages 93 to 100 (M. M. Gentleman et al), clearly envisages compositions based on a mixture of YSZ and YAG as being incompatible for applications in relation to TBCs.

Finally, it will be understood that the present invention has been described in its preferred embodiments and can be modified in many different ways without departing from the scope of the invention as defined by the appended claims.

The invention claimed is:

1. A turbine component having a structure applied thereto as a thermal barrier coating, the structure incorporating a luminescent material composition comprising a first, lower layer which comprises substantially only a first phase, and a second, upper layer which comprises the first phase, as a matrix phase, a second phase containing Y and Al distributed within the matrix phase, and at least one luminescent dopant.

2. The turbine component of claim 1, wherein the matrix phase includes the at least one luminescent dopant or the second phase includes the at least one luminescent dopant.

3. The turbine component of claim 1, wherein the first phase of the first layer and the matrix phase of the second layer comprise a zirconia-based phase, yttria stabilized zirconia (YSZ), partially stabilized zirconia (PSZ), or a zirconate pyrochlore ($A_2Zr_2O_7$) where A is one or more elements selected from the lanthanide series.

4. The turbine component of claim 1, wherein the second phase includes yttria and an aluminate, a YAP-based phase, $YAlO_3$, a YAG-based phase, $Y_3Al_5O_{12}$ or $Y_3Al_xFe_{5-x}O_{12}$, where x>0.

5. A structure incorporating a luminescent material composition comprising a first, lower layer which comprises substantially only a first phase, and a second, upper layer which comprises the first phase, as a matrix phase, a second phase distributed within the matrix phase, and at least one luminescent dopant, wherein the second phase comprises atomic clusters or particles which are distributed within the matrix phase and the clusters or particles have an elongate or ribbon shape and an average length of less than about 150 μm.

6. The turbine component of claim 5, wherein the second phase comprises an yttria-based phase or yttria.

7. The turbine component of claim 1, wherein the second phase comprises atomic clusters or particles which are distributed within the matrix phase and the clusters or particles have a generally uniform shape and an average size of between 1 nm and 5 μm.

8. The turbine component of claim 1, containing the second phase in an amount between 0.1 wt % and 20 wt %.

9. The turbine component of claim 1, wherein the second phase is a substantially crystalline phase, at least partially an amorphous phase or substantially an amorphous phase.

10. The turbine component of claim 1, wherein the second phase is a phase which is chemically and physically stable at temperatures of up to about 1700 C or at temperatures of up to about 1700 C when thermally cycled.

11. The turbine component of claim 1, formed by (i) plasma spraying from precursor powders of the matrix phase and the second phase or (ii) co-precipitation from a solution containing precursor materials in stoichiometric amounts.

12. A turbine component having the structure of claim 5 applied thereto as a thermal barrier coating.

13. The turbine component of claim 1, wherein the at least one luminescent dopant comprises one or more elements selected from the lanthanide series, a single dopant selected from the elements Ce, Dy, Er, Eu, Gd, Ho, Nd, Pr, Sm, Tb, Tm and Yb or a pair of dopants selected from the pairs of elements Gd and Er, Gd and Nd, Gd and Yb, Yb and Nd and Yb and Sm.

14. The turbine component of claim 7, wherein the clusters of particles have an average size of between 1 nm and 2 μm.

15. The turbine component of claim 1, wherein the second phase comprises atomic clusters or particles which are distributed within the matrix phase and the clusters or particles have an elongate or ribbon shape and an average length of less than about 150 μm.

16. The turbine component of claim 15, wherein the clusters or particles have an average length of less than about 100 μm.

17. The turbine component of claim 15, wherein the clusters or particles have an average thickness of less than about 20 μm.

18. The turbine component of claim 5, wherein the first phase of the first layer and the matrix phase of the second layer comprise a zirconia-based phase, yttria stabilized zirconia (YSZ), partially stabilized zirconia (PSZ), or a zirconate pyrochlore ($A_2Zr_2O_7$) where A is one or more elements selected from the lanthanide series.

19. The turbine component of claim 5, wherein the second phase comprises a $GdAlO_3$-based phase or $GdAlO_3$.

20. The turbine component of claim 5, wherein the second phase comprises an $A_2B_2O_7$ (pyrochlore) phase, where A comprises one or more elements selected from the lanthanide series or the actinide series and B comprises one or more elements selected from the group of transition metals.

21. The turbine component of claim 1, containing the second phase in an amount between 0.1 wt % and 10 wt %.

22. The turbine component of claim 1, containing the second phase in an amount between 0.1 wt % and 5 wt %.

23. The turbine component of claim 1, containing the second phase in an amount between 0.1 wt % and 2 wt %.

24. The turbine component of claim 1, containing the second phase in an amount between 0.1 wt % and 1 wt %.

25. The turbine component of claim 7, wherein the clusters of particles have an average size of between 1 nm and 1 μm.

26. The turbine component of claim 7, wherein the clusters of particles have an average size of 1 nm and 100 nm.

27. The turbine component of claim 7, wherein the clusters of particles have an average size of between 1 nm and 50 nm.

28. The turbine component of claim 7, wherein the clusters of particles have an average size of between 20 nm and 50 nm.

29. The turbine component of claim 7, wherein the clusters of particles have an average size of between 1 nm and 20 nm.

30. The turbine component of claim 7, wherein the clusters of particles have an average size of between 1 nm and 10 nm.

31. The turbine component of claim 15, wherein the clusters or particles have an average length of less than about 50 μm.

32. The turbine component of claim 15, wherein the clusters or particles have an average thickness of less than about 10 μm.

33. The turbine component of claim 15, wherein the clusters or particles have an average thickness of less than about 5 μm.

34. A turbine component having a structure applied thereto as a thermal barrier coating, the structure incorporating a luminescent material composition comprising a first, lower layer which comprises substantially only a first phase, and a second, upper layer which comprises the first phase, as a matrix phase, a second phase distributed within the matrix phase, and at least one luminescent dopant, wherein the second phase comprises atomic clusters or particles which are distributed within the matrix phase and the clusters or particles have a generally uniform shape and an average size of between 1 nm and 5 μm.

35. The turbine component of claim 34, wherein the clusters of particles have an average size of between 1 nm and 1 μm.

36. The turbine component of claim 34, wherein the clusters of particles have an average size of 1 nm and 100 nm.

* * * * *